(12) United States Patent
Asakura et al.

(10) Patent No.: US 12,732,120 B2
(45) Date of Patent: Sep. 8, 2026

(54) POWER CONVERSION DEVICE AND FLYING OBJECT

(71) Applicant: Mitsubishi Electric Corporation, Tokyo (JP)

(72) Inventors: Ryota Asakura, Tokyo (JP); Yusuke Shirouchi, Tokyo (JP); Kenji Fujiwara, Tokyo (JP); Tetsunori Kinoshita, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 155 days.

(21) Appl. No.: 18/846,674

(22) PCT Filed: Apr. 4, 2022

(86) PCT No.: PCT/JP2022/017028
§ 371 (c)(1),
(2) Date: Sep. 13, 2024

(87) PCT Pub. No.: WO2023/195041
PCT Pub. Date: Oct. 12, 2023

(65) Prior Publication Data

US 2025/0202384 A1 Jun. 19, 2025

(51) Int. Cl.
*H02M 7/5395* (2006.01)
*H02M 1/00* (2006.01)
*H02M 7/487* (2007.01)

(52) U.S. Cl.
CPC ....... *H02M 7/5395* (2013.01); *H02M 1/0058* (2021.05); *H02M 7/487* (2013.01)

(58) Field of Classification Search
CPC .. H02M 7/5395; H02M 1/0058; H02M 7/487; H02M 1/0048; H02M 1/007;
(Continued)

(56) References Cited

U.S. PATENT DOCUMENTS 8,611,120 B2 * 12/2013 Okuda .................... H02M 7/49 363/132
2011/0211381 A1 9/2011 Iwata et al.
2015/0214856 A1 7/2015 Nakashima et al.

FOREIGN PATENT DOCUMENTS

JP 2004-120968 A 4/2004
JP 2018-186661 A 11/2018
(Continued)

OTHER PUBLICATIONS

International Search Report and Written Opinion mailed on Jun. 21, 2022, received for PCT Application PCT/JP2022/017028, filed on Apr. 4, 2022, 9 pages including English Translation.
(Continued)

*Primary Examiner* — Kyle J Moody
(74) *Attorney, Agent, or Firm* — XSENSUS LLP

(57) ABSTRACT

This power conversion device includes a multilevel inverter which outputs multilevel voltages by adding/subtracting voltage of a sub inverter to/from output voltage of a main inverter. The multilevel inverter can switch between PWM operation in which plural pulses are outputted in each of positive voltage output and negative voltage output in one cycle and a pulse width is controlled, and one-pulse operation in which one pulse is outputted in each of positive voltage output and negative voltage output in one cycle, and has a current-split switching mode in which current flowing between a neutral point and the sub inverter flows through a first switch group and a second switch group provided to the main inverter and connected in parallel, in a case where the main inverter outputs zero voltage which is the potential of the neutral point, in the one-pulse operation.

20 Claims, 30 Drawing Sheets

(58) Field of Classification Search
CPC ............. H02M 1/0093; H02M 1/0095; H02M 7/4835; H02M 7/49
See application file for complete search history.

(56) References Cited

FOREIGN PATENT DOCUMENTS

| | | | |
|---|---|---|---|
| WO | 2010/058536 | A1 | 5/2010 |
| WO | 2014/024321 | A1 | 2/2014 |

OTHER PUBLICATIONS

Sridhar R Pulikanti et al: "Hybrid Seven-Level Cascaded Active Neutral-Point-Clamped-Based Multilevel Converter Under SHE-PWM", IEEE Transactions on Industrial Electronics, IEEE Service Center, Piscataway, NJ, USA, vol. 60, No. 11, Nov. 1, 2013 (Nov. 1, 2013), pp. 4794-4804, XP011514232.
Feng Zhijian et al: "Comparative Study of 2SiC&4Si Hybrid Configuration Schemes in ANPC Inverter", IEEE Access, IEEE, USA, vol. 8, Feb. 17, 2020 (Feb. 17, 2020), pp. 33934-33943, XP011774474.
European Search Report issued May 2, 2025 in Patent Application No. 22936444.3, 9pp.

* cited by examiner

| Symbol | $V_{out}$ | Sw1 | Sw2 | Sw3 | Sw4 | Sw5 | Sw6 |
|---|---|---|---|---|---|---|---|
| [ + ] | $V_{DCP}$ | 1 | 1 | 0 | 0 | 0 | 1 |
| [0o2] | ZERO VOLTAGE | 0 | 1 | 0 | 0 | 1 | 0 |
| [0o1] | ZERO VOLTAGE | 0 | 1 | 0 | 1 | 1 | 0 |
| [0u1] | ZERO VOLTAGE | 1 | 0 | 1 | 0 | 0 | 1 |
| [0u2] | ZERO VOLTAGE | 0 | 0 | 1 | 0 | 0 | 1 |
| [ - ] | $-V_{DCN}$ | 0 | 0 | 1 | 1 | 1 | 0 |

FIG. 5

| | Sw1 | | Sw2 | | Sw3 | | Sw4 | | Sw5 | | Sw6 | |
|---|---|---|---|---|---|---|---|---|---|---|---|---|
| | T1 | Di1 | T2 | Di2 | T3 | Di3 | T4 | Di4 | T5 | Di5 | T6 | Di6 |
| Id>0 | | | | | | | | | | | | |
| [+]<->[0o2] | Sw_loss | | | | | | | | | Di_loss | | |
| [+]<->[0o1] | Sw_loss | | | | | | | | | Di_loss | | |
| [+]<->[0u1] | | | Sw_loss | | | Di_loss | | | | | | |
| [+]<->[0u2] | Sw_loss | | | | | Di_loss | | | | | | |
| [0o2]<->[-] | | | Sw_loss | | | | | Di_loss | | | | |
| [0o1]<->[-] | | | Sw_loss | | | Di_loss | | | | | | |
| [0u1]<->[-] | | | | | | | | Di_loss | | | Sw_loss | |
| [0u2]<->[-] | | | | | | | | Di_loss | | | Sw_loss | |
| Id<0 | | | | | | | | | | | | |
| [+]<->[0o2] | | Di_loss | | | | | | | Sw_loss | | | |
| [+]<->[0o1] | | Di_loss | | | | | | | Sw_loss | | | |
| [+]<->[0u1] | | | | Di_loss | Sw_loss | | | | | | | |
| [+]<->[0u2] | | Di_loss | | | Sw_loss | | | | | | | |
| [0o2]<->[-] | | | | Di_loss | | | Sw_loss | | | | | |
| [0o1]<->[-] | | | | Di_loss | Sw_loss | | | | | | | |
| [0u1]<->[-] | | | | | | | Sw_loss | | | | | Di_loss |
| [0u2]<->[-] | | | | | | | Sw_loss | | | | | Di_loss |

FIG. 6

SWITCHING PATTERN A

| Symbol | Vout | Sw1 | Sw2 | Sw3 | Sw4 | Sw5 | Sw6 |
|---|---|---|---|---|---|---|---|
| [ + ] | $V_{DCP}$ | 1 | 1 | 0 | 0 | 0 | 1 |
| [0ou] | ZERO VOLTAGE | 0 | 1 | 1 | 0 | 1 | 1 |
| [ - ] | $-V_{DCN}$ | 0 | 0 | 1 | 1 | 1 | 0 |

FIG. 9

SWITCHING PATTERN B

| Symbol | Vout | Sw1 | Sw2 | Sw3 | Sw4 | Sw5 | Sw6 |
|---|---|---|---|---|---|---|---|
| [ +" ] | $V_{DCP}$ | 1 | 1 | 0 | 0 | 0 | 0 |
| [0ou] | ZERO VOLTAGE | 0 | 1 | 1 | 0 | 1 | 1 |
| [ -" ] | $-V_{DCN}$ | 0 | 0 | 1 | 1 | 0 | 0 |

FIG. 10

SWITCHING PATTERN A

| | Sw1 | | Sw2 | | Sw3 | | Sw4 | | Sw5 | | Sw6 | |
|---|---|---|---|---|---|---|---|---|---|---|---|---|
| | T1 | Di1 | T2 | Di2 | T3 | Di3 | T4 | Di4 | T5 | Di5 | T6 | Di6 |
| Id>0 | | | | | | | | | | | | |
| [+]<->[0ou] | Sw_loss | | | | | Di_loss2 | | | | Di_loss2 | | |
| [0ou]<->[-] | | | Sw_loss2 | | | | | Di_loss | | | Sw_loss2 | |
| Id<0 | | | | | | | | | | | | |
| [+]<->[0ou] | | Di_loss | | | Sw_loss2 | | | | Sw_loss2 | | | |
| [0ou]<->[-] | | | | Di_loss2 | | | Sw_loss | | | | | Di_loss2 |

FIG. 11

SWITCHING PATTERN B

| | Sw1 | | Sw2 | | Sw3 | | Sw4 | | Sw5 | | Sw6 | |
|---|---|---|---|---|---|---|---|---|---|---|---|---|
| | T1 | Di1 | T2 | Di2 | T3 | Di3 | T4 | Di4 | T5 | Di5 | T6 | Di6 |
| Id>0 | | | | | | | | | | | | |
| [+"]<->[0ou] | Sw_loss | | | | Sw_loss3 | | | | | Di_loss | Sw_loss3 | |
| [0ou]<->[-"] | | | Sw_loss2 | | | | | Di_loss | | | Sw_loss2 | |
| Id<0 | | | | | | | | | | | | |
| [+"]<->[0ou] | | Di_loss | | | Sw_loss2 | | | | Sw_loss2 | | | |
| [0ou]<->[-"] | | | Sw_loss3 | | | | Sw_loss | | Sw_loss3 | | | Di_loss |

SWITCHING PATTERN A

Id>0 : [-] -> [0au]

[-] MODE

DEAD TIME PERIOD AT SWITCHING

[0au] MODE

FIG. 15

SWITCHING PATTERN B

Id>0 : [-"] -> [0ou]

[-"] MODE

DEAD TIME PERIOD AT SWITCHING

[0ou] MODE

SWITCHING PATTERN B

Id<0 : [+"] -> [0ou]

[+"] MODE

DEAD TIME PERIOD AT SWITCHING

[0ou] MODE

FIG. 18

SWITCHING PATTERN A

Id<0 : [-] -> [0ou]

[-] MODE

DEAD TIME PERIOD AT SWITCHING

[0ou] MODE

Sw1 Sw2 Sw3 Sw4 Sw5 Sw6

ON OFF

SWITCHING PATTERN B

Id<0 : [-"] -> [0ou]

[-"] MODE

DEAD TIME PERIOD AT SWITCHING

[0ou] MODE

FIG. 20

POWER CONVERSION DEVICE AND FLYING OBJECT

CROSS-REFERENCE TO RELATED APPLICATION

This application is a national stage application, pursuant to 35 U.S.C. § 371, of International Patent Application No. PCT/JP2022/017028, filed Apr. 4, 2022, the entire contents of which are incorporated herein by reference.

TECHNICAL FIELD

The present disclosure relates to a power conversion device and a flying object including the same.

BACKGROUND ART

An inverter which is one of power conversion devices is required to have a small size and a light weight in various applications, but in some cases, the inverter size is increased due to a noise filter in order to take measures against noise that occurs through switching operation. As an inverter technology, there is known a multilevel inverter in which a sub inverter is connected in series to a main inverter and which outputs multilevel voltages. The multilevel inverter performs gradational operation that enables output of multilevel voltages by adding or subtracting voltage of the sub inverter to or from output voltage of the main inverter (for example, Patent Document 2). Therefore, the multilevel inverter may be called a gradational control inverter. The gradational control inverter can output many multilevel voltages and can obtain a voltage waveform closer to a sinewave, whereby noise can be reduced, so that the noise filter can be formed with a small size and a light weight.

As a similar circuit configuration, Patent Document 1 describes a multilevel inverter composed of a 3-level converter (main inverter) and a voltage adjustment unit (sub inverter) connected in series to the 3-level converter. In the multilevel inverter described in Patent Document 1, a controller controls the main inverter and the sub inverter, using pulse width modulation (PWM), whereby the size of a capacitor of the sub inverter is reduced and thus the power conversion device can be formed with a small size and a light weight.

CITATION LIST

Patent Document

Patent Document 1: Japanese Laid-Open Patent Publication No. 2018-186661

Patent Document 2: Japanese Laid-Open Patent Publication No. 2004-120968

SUMMARY OF THE INVENTION

Problem to be Solved by the Invention

For a power conversion device as a power source for a flying object such as an electric aircraft which flies in the air, it is required that loss is small, the sizes of a cooler and the like are small, and the entire weight is light. However, in the multilevel inverter described in Patent Document 1, since the main inverter is subjected to PWM control, the switching frequency is high and thus switching loss is great. In addition, Patent Document 1 has no description about specific means for reducing loss in the power conversion device.

The multilevel inverter that can output multilevel voltages by adding or subtracting voltage of the sub inverter to or from output voltage of the main inverter can be formed with a smaller size and a lighter weight, but a power conversion device that is further reduced in size and weight is required in a case of being provided in a flying object.

The present disclosure has been made to solve the above problem, and an object of the present disclosure is to provide such a power conversion device that switching loss and conduction loss in a multilevel inverter of a type in which voltage of a sub inverter is added or subtracted to or from output voltage of a main inverter are further reduced to enhance efficiency, thus reducing the size and the weight of the power conversion device.

Means to Solve the Problem

A power conversion device according to the present disclosure includes: a main inverter including a plurality of switches each composed of a switching element and a diode connected in parallel to the switching element, the main inverter being provided with capacitors having a neutral point between a plus terminal to which a plus potential of DC is applied and a minus terminal to which a minus potential of DC is applied, the main inverter being capable of outputting at least the potential of the plus terminal, the potential of the minus terminal, and a potential of the neutral point; a sub inverter connected to output of the main inverter; and a controller which controls the main inverter and the sub inverter. The main inverter and the sub inverter form a multilevel inverter that outputs multilevel voltages by adding or subtracting voltage of the sub inverter to or from output voltage of the main inverter. The main inverter includes such a configuration that a first switch group in which at least a first switch and a second switch are connected in series and a second switch group in which at least a third switch and a fourth switch are connected in series, are connected in parallel between the neutral point and the sub inverter. The controller is capable of switching operation of the main inverter between PWM operation in which a plurality of pulses are outputted in each of output of the potential of the plus terminal and output of the potential of the minus terminal in one cycle and a pulse width is controlled, and one-pulse operation in which one pulse is outputted in each of output of the potential of the plus terminal and output of the potential of the minus terminal in one cycle, and the controller has a current-split switching mode for controlling a plurality of the switching elements included in the main inverter so that current flowing between the neutral point and the sub inverter flows through the first switch group and the second switch group at the same time, in a case where the main inverter outputs zero voltage which is the potential of the neutral point, in the one-pulse operation.

Effect of the Invention

According to the present disclosure, it is possible to provide such a power conversion device that switching loss and conduction loss are further reduced in a multilevel inverter of a type in which voltage of a sub inverter is added or subtracted to or from output voltage of a main inverter, thus reducing the size and the weight of the power conversion device.

BRIEF DESCRIPTION OF THE DRAWINGS

FIG. 5 illustrates operation of the main inverter in the power conversion device according to embodiment 1.

FIG. 6 illustrates switchover loss in each switch of the main inverter in the power conversion device according to embodiment 1.

FIG. 9 illustrates operation in a switching pattern A of the main inverter in the power conversion device according to embodiment 1.

FIG. 10 illustrates operation of a switching pattern B of the main inverter in the power conversion device according to embodiment 1.

FIG. 11 illustrates loss in each switch in the switching pattern A of the main inverter in the power conversion device according to embodiment 1.

FIG. 12 illustrates loss in each switch in the switching pattern B of the main inverter in the power conversion device according to embodiment 1.

Figure 13:
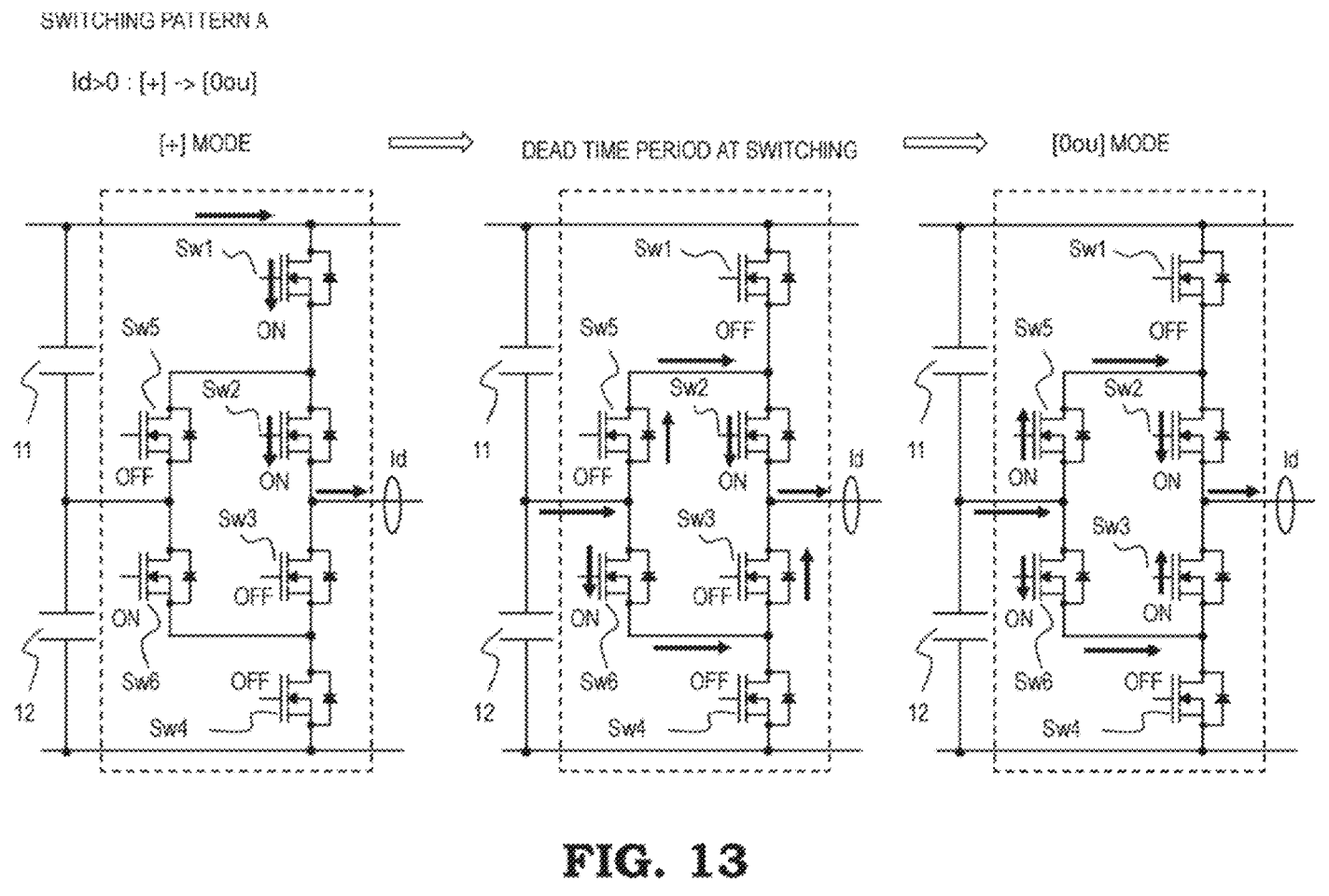

FIG. 13 is a first diagram showing operation in the switching pattern A of the main inverter in the power conversion device according to embodiment 1.

Figure 14:
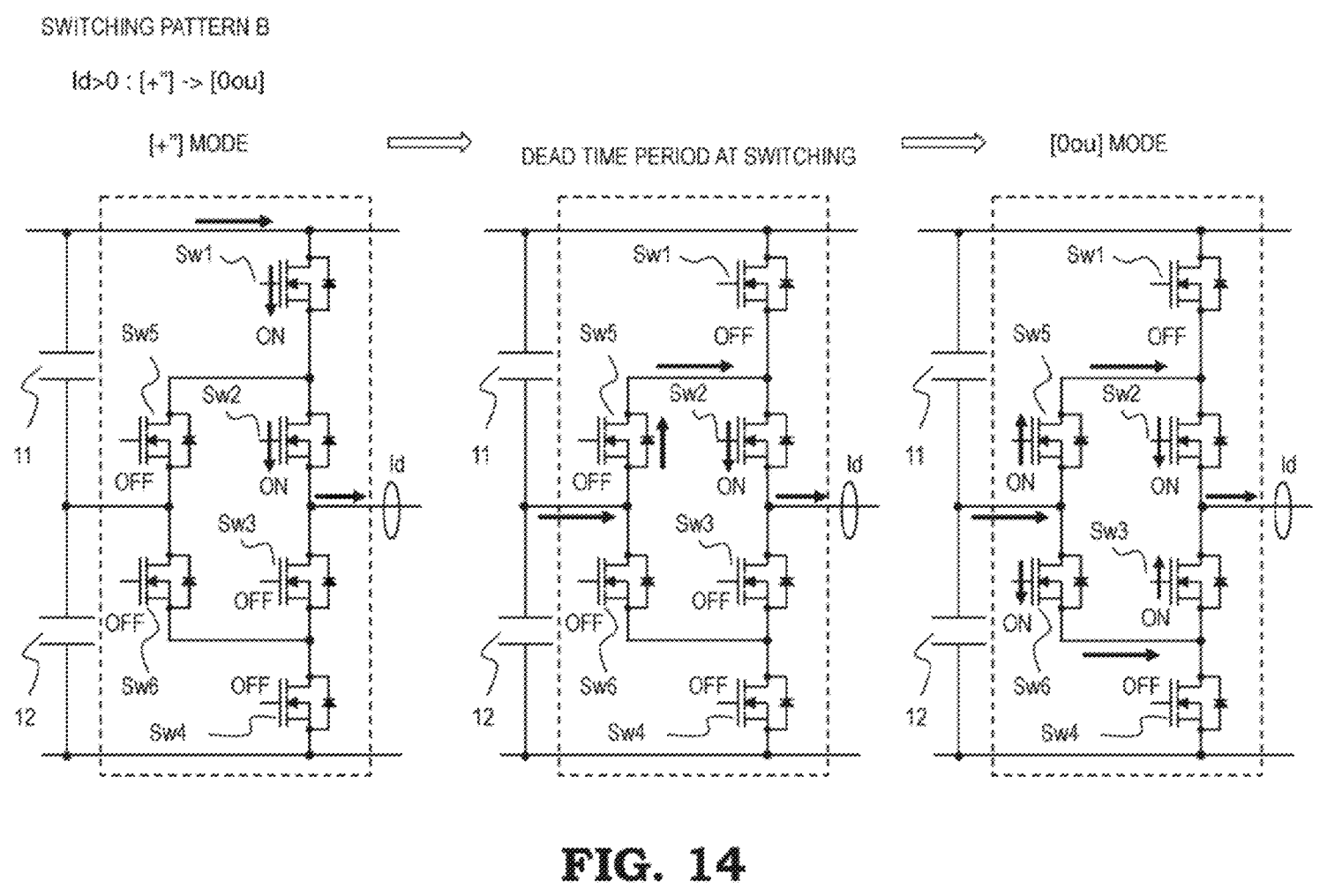

FIG. 14 is a first diagram showing operation in the switching pattern B of the main inverter in the power conversion device according to embodiment 1.

Figure 15:
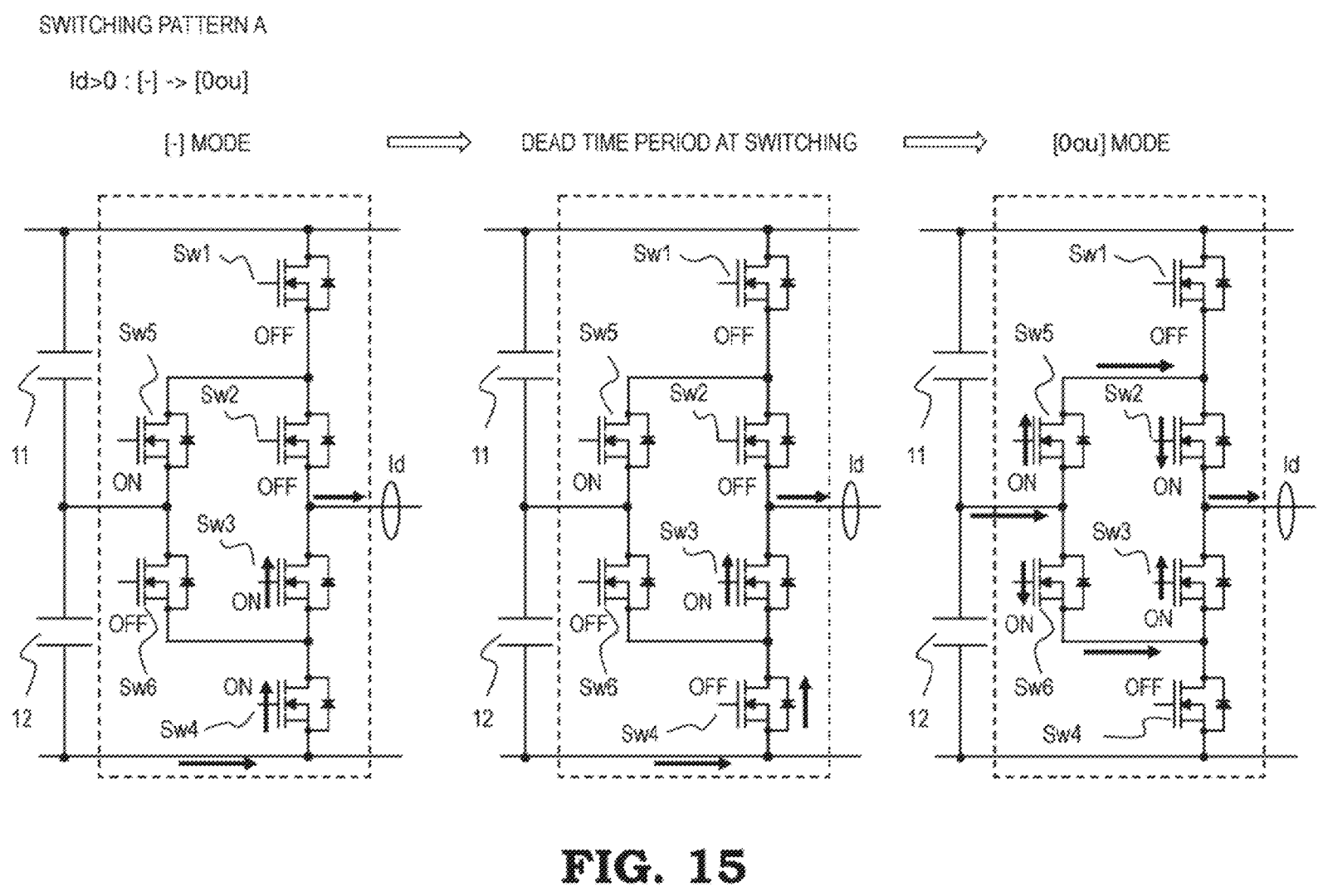

FIG. 15 is a second diagram showing operation in the switching pattern A of the main inverter in the power conversion device according to embodiment 1.

Figure 16:
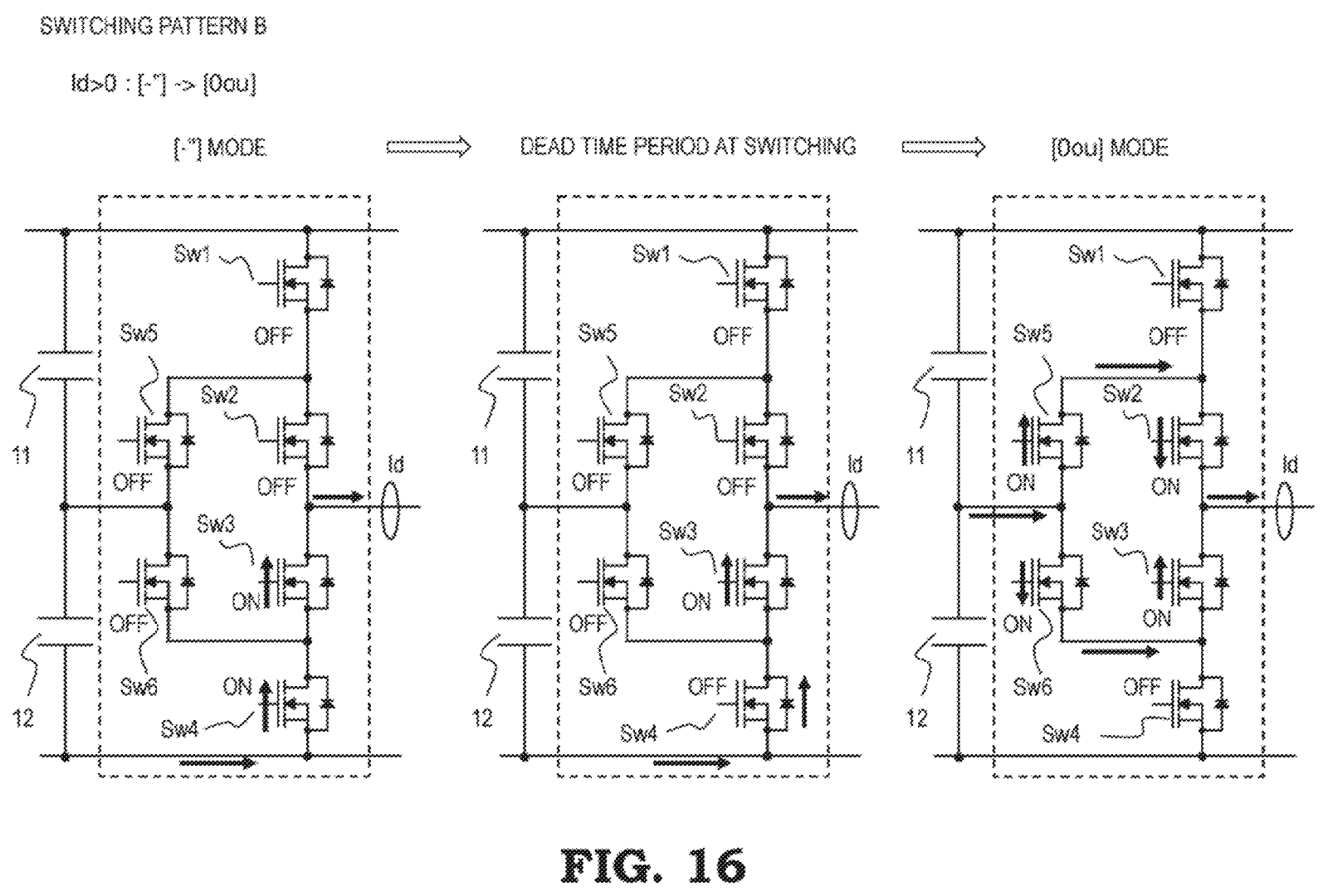

FIG. 16 is a second diagram showing operation in the switching pattern B of the main inverter in the power conversion device according to embodiment 1.

Figure 18:
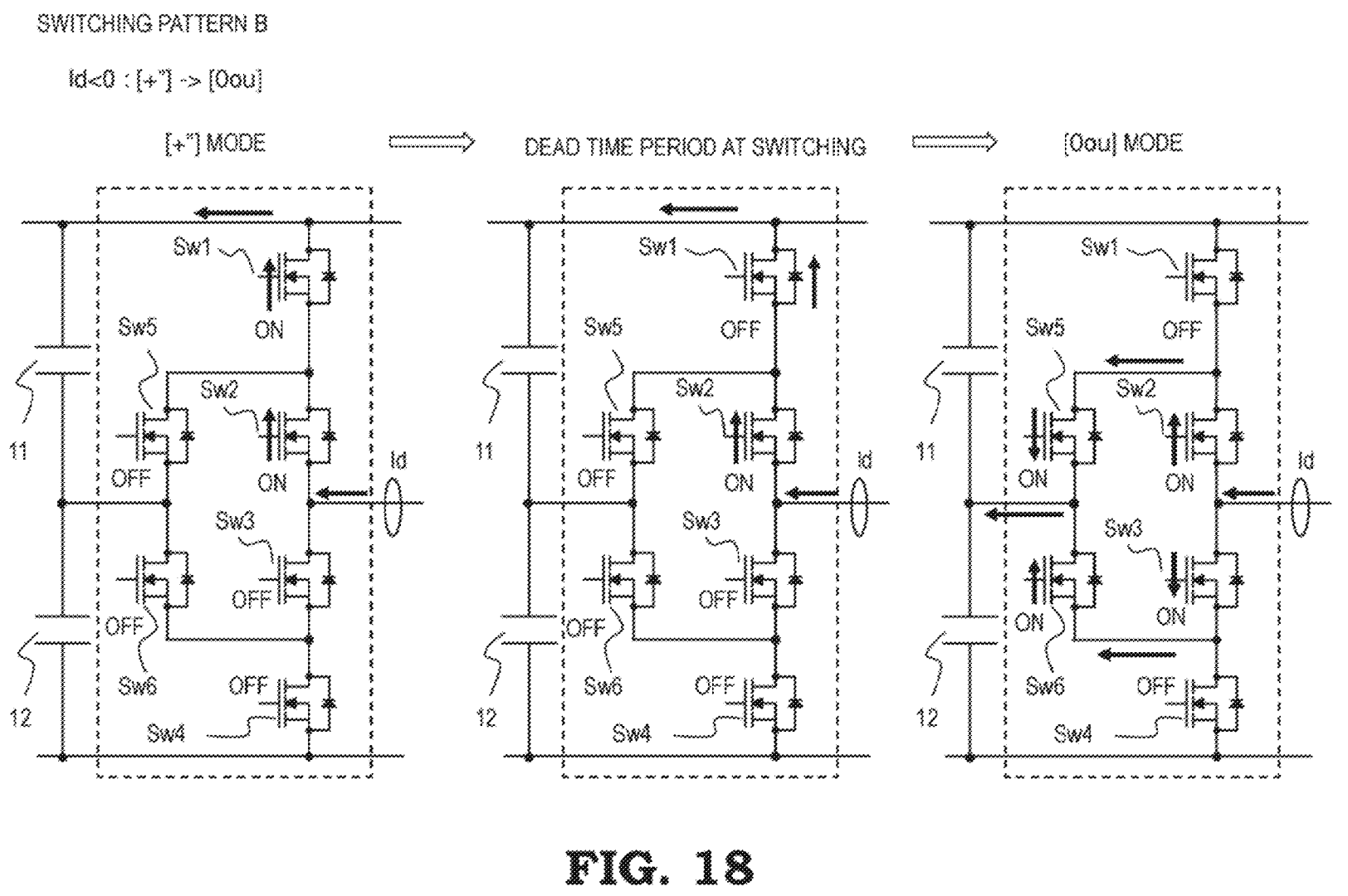

FIG. 18 is a third diagram showing operation in the switching pattern B of the main inverter in the power conversion device according to embodiment 1.

Figure 19:
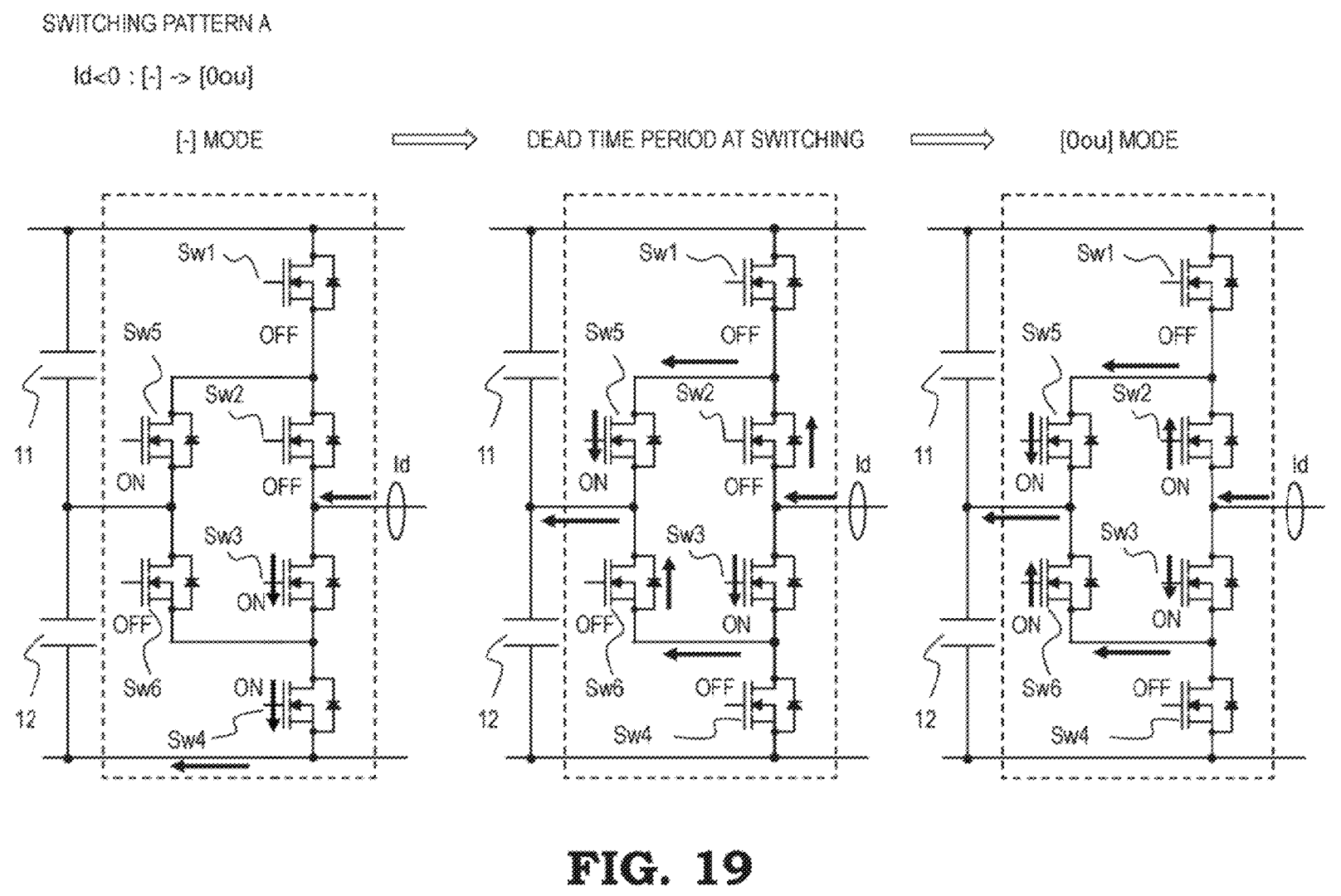

FIG. 19 is a fourth diagram showing operation in the switching pattern A of the main inverter in the power conversion device according to embodiment 1.

Figure 20:
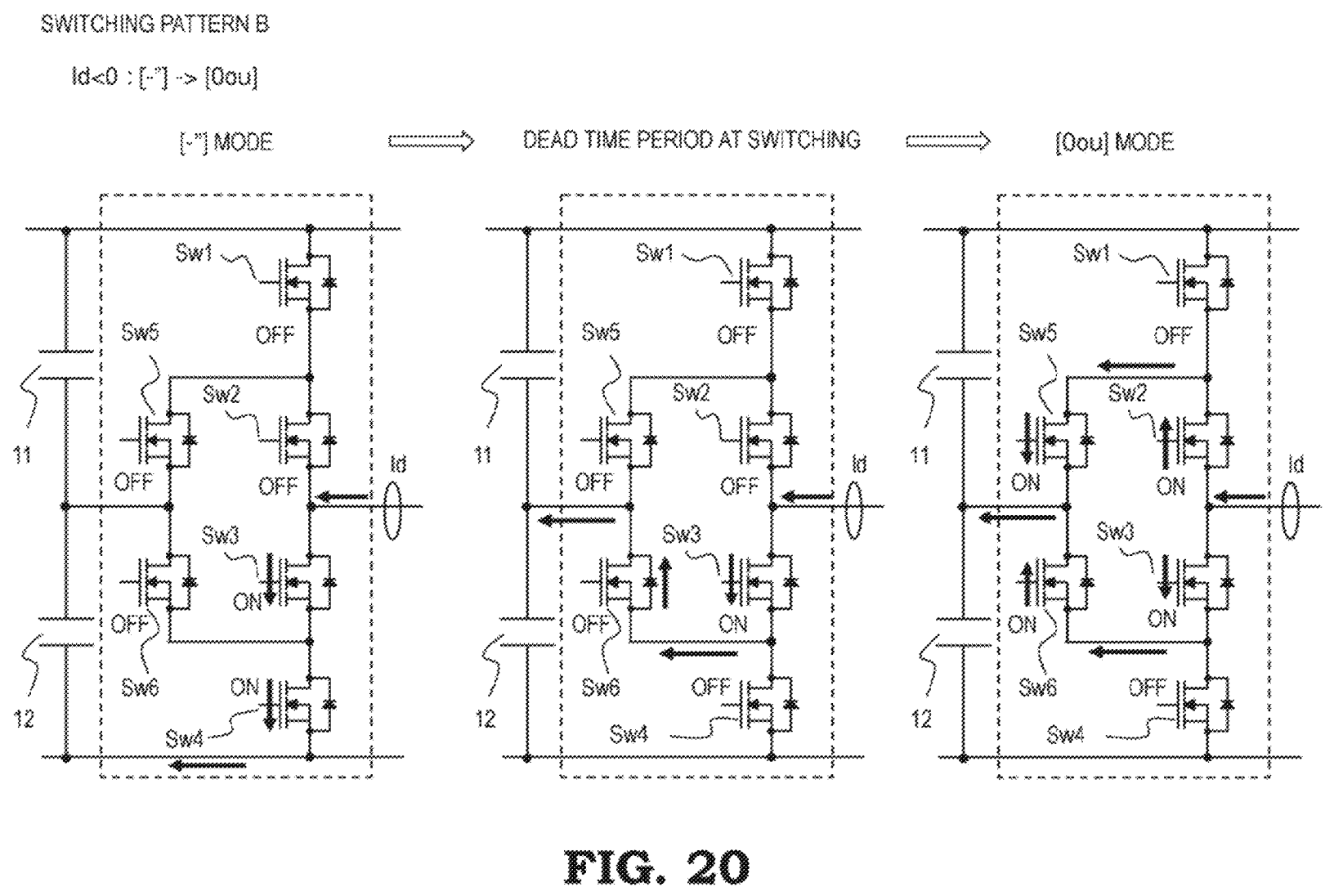

FIG. 20 is a fourth diagram showing operation in the switching pattern B of the main inverter in the power conversion device according to embodiment 1.

DESCRIPTION OF EMBODIMENTS

Embodiment 1

Figure 1:
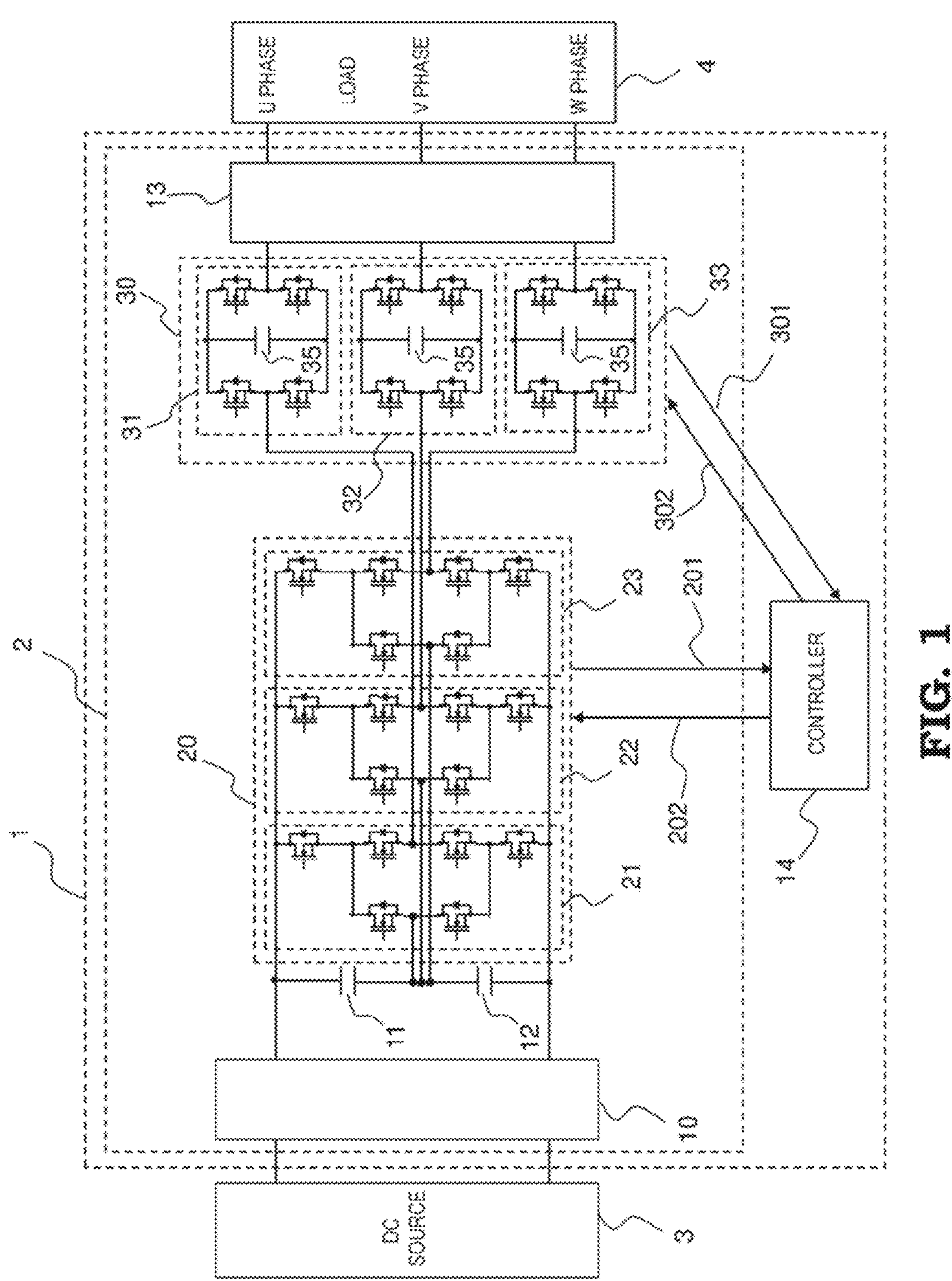
FIG. 1 is a circuit diagram showing the configuration of a power conversion device according to embodiment 1.

FIG. 1 is a circuit diagram showing the configuration of a power conversion device 1 of embodiment 1. The power conversion device 1 of the present embodiment 1 includes a multilevel inverter 2 as a DC/AC converter for converting DC power from a DC source 3 to AC power needed for driving a load 4. The multilevel inverter 2 is connected between the DC source 3 and the load 4.

A case where the DC source 3 supplies power through DC wiring is described as an example, but an individual DC power supply system, a solar battery, or the like may be employed. In a case where the DC source 3 supplies power through DC wiring, on the DC wiring side, a DC source may be provided by a DC/DC power conversion device or an AC/DC power conversion device capable of step-up operation, step-down operation, or step-up and step-down operations so as to supply DC voltage. In addition, a DC/DC power conversion device may be provided between the DC source 3 and the power conversion device 1.

The load 4 is a load composed of at least one passive component of a resistor, an inductor, and a capacitor, for example. The load 4 may be an electric motor or the like. The load 4 may be a power grid, and in this case, the output of the power conversion device 1 is connected to the power grid.

The multilevel inverter 2 includes an input noise filter 10, two series capacitors 11, 12, a main inverter 20, a sub inverter 30, and an output noise filter 13, and is controlled by the controller 14. These components will be described below.

The main inverter 20 is connected on the DC source 3 side relative to the sub inverter 30. In the present embodiment 1, the main inverter 20 will be described using a 3-phase 3-level inverter as an example. In the power conversion device according to the present disclosure, the main inverter 20 is not limited to a 3-phase inverter, and may be a single-phase inverter or an inverter having a plurality of output phases that are not three phases.

The main inverter 20 shown in FIG. 1 is a three-phase inverter, and has three output phases formed by a U-phase main inverter arm 21, a V-phase main inverter arm 22, and a W-phase main inverter arm 23. The main inverter 20 includes, in the main inverter arms 21, 22, 23 for the respective output phases, six semiconductor switches such as IGBTs or MOSFETs capable of switching, freewheel diodes (FWD) connected in antiparallel to the semiconductor switches, and a gate driving circuit (not shown). In general, a MOSFET is superior in high-speed switching property, and has a low ON resistance in a low current region, so that semiconductor loss is reduced. Therefore, a MOSFET is preferably applied. An inverter having MOSFETs and IGBTs in combination may be used.

The main inverter 20 shown in FIG. 1 is also called an active-neutral-point-clamped (ANPC) inverter. The main inverter 20 is not limited to a 3-level inverter, and may be any multilevel inverter having another number of output levels. Further, the main inverter 20 may have another circuit configuration as long as the circuit can be configured using a plurality of semiconductor switches or the like so that circuit currents described later flow in a split manner between an output end and a neutral point between the two series capacitors 11, 12. The gate driving circuit may be configured such that the gate impedance of a circuit element of the gate driving circuit can be changed in order to change the switching speed of the semiconductor switch.

The main inverter 20 is a 3-level inverter and is connected to the neutral point of the two series capacitors 11, 12 which divide voltage of the DC source 3. A DC bus voltage value of the main inverter 20 which is voltage of the DC source 3 is referred to as $V_{DC}$. Of the two series capacitors 11, 12, the capacitor on the high potential side is referred to as a P bus capacitor 11, the voltage value thereof is referred to as $V_{DCP}$, the capacitor on the low potential side is referred to as an N bus capacitor 12, and the voltage value thereof is referred to as $V_{DCN}$. In the main inverter 20, the semiconductor switches are subjected to driving control by a driving signal 202 from the controller 14, and outputs any of voltage $+V_{DCP}$ of the P bus capacitor 11, voltage $-V_{DCN}$ of the N bus capacitor 12, and neutral point voltage at a connection point between the P bus capacitor 11 and the N bus capacitor 12, with the neutral point potential as reference voltage.

The main inverter 20 includes voltage detection means for detecting voltage $V_{DCP}$ of the P bus capacitor 11 and voltage $V_{DCN}$ of the N bus capacitor 12 of the main inverter 20. The voltage detection means may be known means, e.g., detecting the voltage $V_{DCP}$ and the voltage $V_{DCN}$ by measuring voltage across each of the P bus capacitor 11 and the N bus capacitor 12. Detection signals 201 from the voltage detection means, a current detector described later, and the like, are sent to the controller 14, and the controller 14 generates and outputs the driving signal 202 for driving each semiconductor switch of the main inverter 20, using information of the detection signals 201, to control operation of the main inverter 20.

The sub inverter 30 is a single-phase inverter connected in series to the main inverter 20, connected on the load 4 side relative to the main inverter 20, and having a capacitor 35. Specifically, the sub inverters 30 are respectively connected in series to terminals of the U-phase main inverter arm 21, the V-phase main inverter arm 22, and the W-phase main inverter arm 23 of the main inverter 20. The sub inverters 30 connected in series to the phase main inverter arms 21, 22, 23 of the main inverter 20 are respectively referred to as a U-phase sub inverter 31, a V-phase sub inverter 32, and a W-phase sub inverter 33. The sub inverter 30 is a full-bridge inverter, and includes, in each bridge, two semiconductor switches such as IGBTs or MOSFETs capable of switching, FWDs connected in antiparallel to the semiconductor switches, and a gate driving circuit. The gate driving circuit of the sub inverter 30 may be configured such that the gate impedance can be changed.

The voltage values of the capacitors 35 of the U-phase sub inverter 31, the V-phase sub inverter 32, and the W-phase sub inverter 33 are referred to as $V_{DCSU}$, $V_{DCSV}$, $V_{DCSW}$, respectively. The capacitor voltages $V_{DCSU}$, $V_{DCSV}$, $V_{DCSW}$ of the phase sub inverters 31, 32, 33 may be collectively referred to as capacitor voltage $V_{DCS}$ of the sub inverter 30. The sub inverter 30 includes voltage detection means for detecting the capacitor voltage $V_{DCS}$ of the sub inverter 30. The voltage detection means may be known means, e.g., detecting the capacitor voltage $V_{DCS}$ by measuring voltage across the capacitor 35. A detection signal 301 is sent from the voltage detection means to the controller 14, and each semiconductor switch of the sub inverter 30 is controlled by a driving signal 302, so that the capacitor voltage $V_{DCS}$ of the sub inverter 30 is controlled to be predetermined voltage. The predetermined voltage is set to be smaller than voltage of the DC source 3 which is the DC bus voltage $V_{DC}$ of the main inverter 20. In the present embodiment, a case where the capacitor voltage $V_{DCS}$ of the sub inverter 30 is ¼ of the DC bus voltage $V_{DC}$ of the main inverter 20 is described as an example. The predetermined voltage may be any value smaller than the voltage of the DC source 3, and is not limited to ¼ of the DC bus voltage $V_{DC}$ of the main inverter 20. In FIG. 1, the sub inverter 30 is shown as one full-bridge inverter, but the sub inverter 30 may be formed of a plurality of full-bridge inverters connected in series.

The semiconductor switches and the diodes described above may be formed of a Si semiconductor, or one or more of the semiconductor switches and the diodes may be formed of a wide bandgap semiconductor such as SiC or GaN. Using the wide bandgap semiconductor can reduce loss as compared to the Si semiconductor.

The input noise filter 10 is connected between the DC source 3 and the two series capacitors, i.e., the P bus capacitor 11 and the N bus capacitor 12. The output noise filter 13 is connected between the sub inverter 30 and the load 4. The input noise filter 10 and the output noise filter 13 are each formed of at least one of a common mode filter and a normal mode filter so as to reduce noise, surge voltage, and the like. Depending on effects of a measure for decreasing components, a measure for noise, and the like, the multilevel inverter 2 may include only one of the input noise filter 10 and the output noise filter 13.

Figure 30:
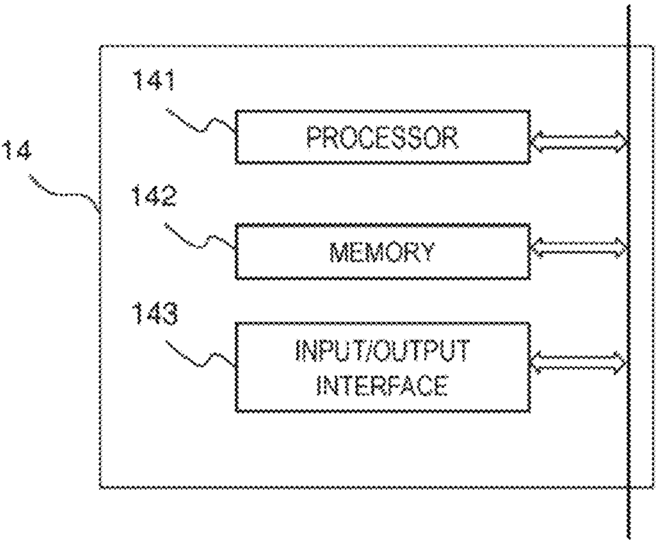
FIG. 30 is a block diagram showing an example of the configuration of a controller in the power conversion device according to the present disclosure.

The controller 14 includes, specifically, as shown in FIG. 30, a processor 141 such as a central processing unit (CPU), a memory 142 for sending/receiving data to/from the processor 141, an input/output interface 143 via which a signal is inputted/outputted between the processor 141 and the outside, and the like. As the processor 141, an application specific integrated circuit (ASIC), an integrated circuit (IC), a digital signal processor (DSP), a field programmable gate array (FPGA), various signal processing circuits, and the like, may be provided. A plurality of processors 141 that are the same type or different types may be provided and execute each processing in a shared manner. As the memory 142, a random access memory (RAM) configured to allow data to be read and written from the processor 141, a read only memory (ROM) configured to allow data to be read from the processor 141, and the like, are provided. The input/output interface 143 is composed of, for example, an A/D converter for inputting the detection signals 201 and 301 outputted from the voltage detection means provided to the main inverter 20 and the sub inverter 30, a current detector 15 described later, and the like to the processor 141, a driving circuit for outputting a driving signal to each switching element, and the like.

The controller 14 controls the main inverter 20 and the sub inverter 30 on the basis of information about the voltage $V_{DCP}$ of the P bus capacitor 11 of the main inverter 20, the voltage $V_{DCN}$ of the N bus capacitor 12 of the main inverter 20, and the capacitor voltage $V_{DCS}$ for each phase of the sub inverter 30, detected by voltage detection means. Specifically, the controller 14 controls output voltages outputted from the main inverter 20 and the sub inverter 30, to perform control so that difference voltage between the voltage $V_{DCP}$ of the P bus capacitor 11 and the voltage $V_{DCN}$ of the N bus capacitor 12 of the main inverter 20 becomes 0, and perform control so that the capacitor voltage $V_{DCS}$ of the sub inverter 30 becomes the predetermined voltage. Each voltage control by the controller 14 is, for example, such PI control that predetermined target voltage to be outputted and voltage detected by voltage detection means are made close to each other. In addition, in order to control load current, the controller 14 may detect phase current of the multilevel inverter 2 and control the load current on the basis of the phase current. For example, the phase current of the multilevel inverter 2 may be detected and subjected to dq conversion, and the dq-converted current may be subjected to PI control or the like, thus controlling the current.

Next, pulse operation for performing switching operation of the multilevel inverter 2 in the power conversion device 1 of the present embodiment 1 will be described. The multilevel inverter 2 performs gradational operation that enables output of multilevel voltages by adding or subtracting output voltage of the sub inverter 30 to or from output voltage of the main inverter 20. In the multilevel inverter 2, regarding the main inverter 20, PWM operation and one-pulse operation can be selected as pulse operation. In the PWM operation, switching is performed a plurality of times for each of a positive polarity and a negative polarity in one cycle, to output a plurality of positive voltage pulses and a plurality of negative voltage pulses in one cycle. In the one-pulse operation, switching is performed such that the switching frequency is substantially equal to a fundamental frequency (frequency of predetermined target voltage to be outputted) of output of the multilevel inverter 2 and one-pulse voltage is outputted for each of a positive polarity and a negative polarity in one cycle.

Figure 2:
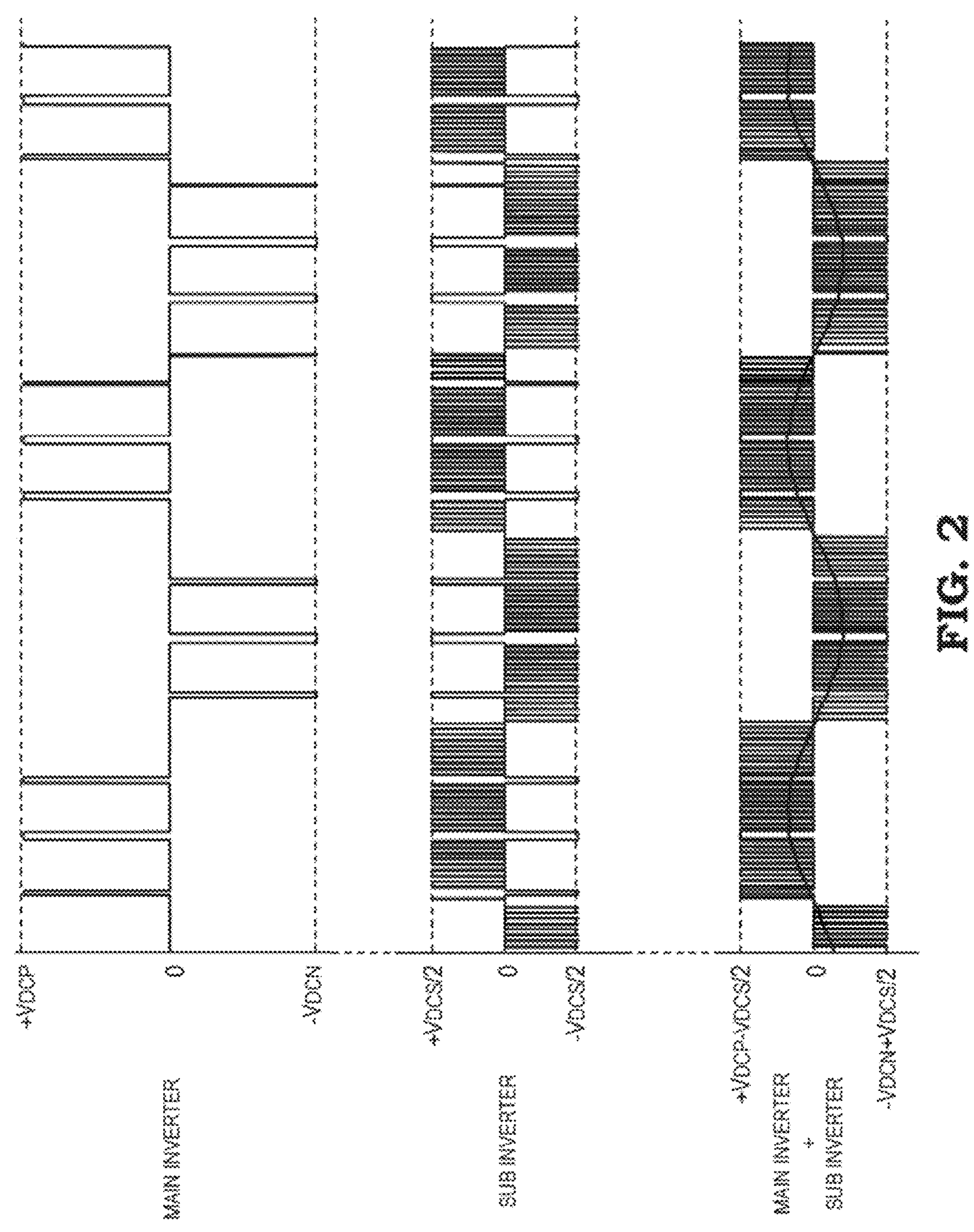
FIG. 2 shows voltage waveforms at respective parts when a main inverter performs PWM operation in the power conversion device according to embodiment 1.

FIG. 2 shows an example of operation in a case where the controller 14 performs control so as to perform PWM operation of the main inverter 20 of the multilevel inverter 2 in order to output target voltage. In FIG. 2, voltage waveforms in the PWM operation for one of U phase, V phase, and W phase of the multilevel inverter 2, are shown. The other two phases have voltage waveforms whose phases are shifted by 120 degrees and 240 degrees from the voltage waveforms shown in FIG. 2. In FIG. 2, the voltage waveform at the upper stage is a voltage waveform in which the potential at the neutral point which is the connection point between the P bus capacitor 11 and the N bus capacitor 12 of the main inverter 20 is a reference, i.e., the neutral point potential is voltage 0. The voltage waveform at the middle stage is a voltage waveform between the input end and the output end of the sub inverter 30. Of the voltage waveforms at the lower stage, a comb-shaped waveform is a voltage waveform at the output end of the sub inverter 30 with the neutral point potential as a reference, and a sine-curve waveform at the lower stage is a waveform of an output voltage command for the multilevel inverter 2. In this example, $V_{DCS}=V_{DC}$ $(=V_{DCP}+V_{DCN})/4$ is assumed. By the controller 14, the main inverter 20 having great capacitor voltages ($V_{DCP}$, $V_{DCN}$) and the sub inverter 30 having small capacitor voltage ($V_{DCS}$) both undergo PWM operation and the sub inverter 30 performs switching with a higher frequency than the main inverter 20. The sub inverter 30 outputs a difference between target voltage for the multilevel inverter 2 and output voltage of the main inverter 20. The controller 14 may perform control so as to perform PWM operation in which switching of the main inverter 20 has a frequency equal to or higher than that of the sub inverter 30, though loss increases.

Figure 3:
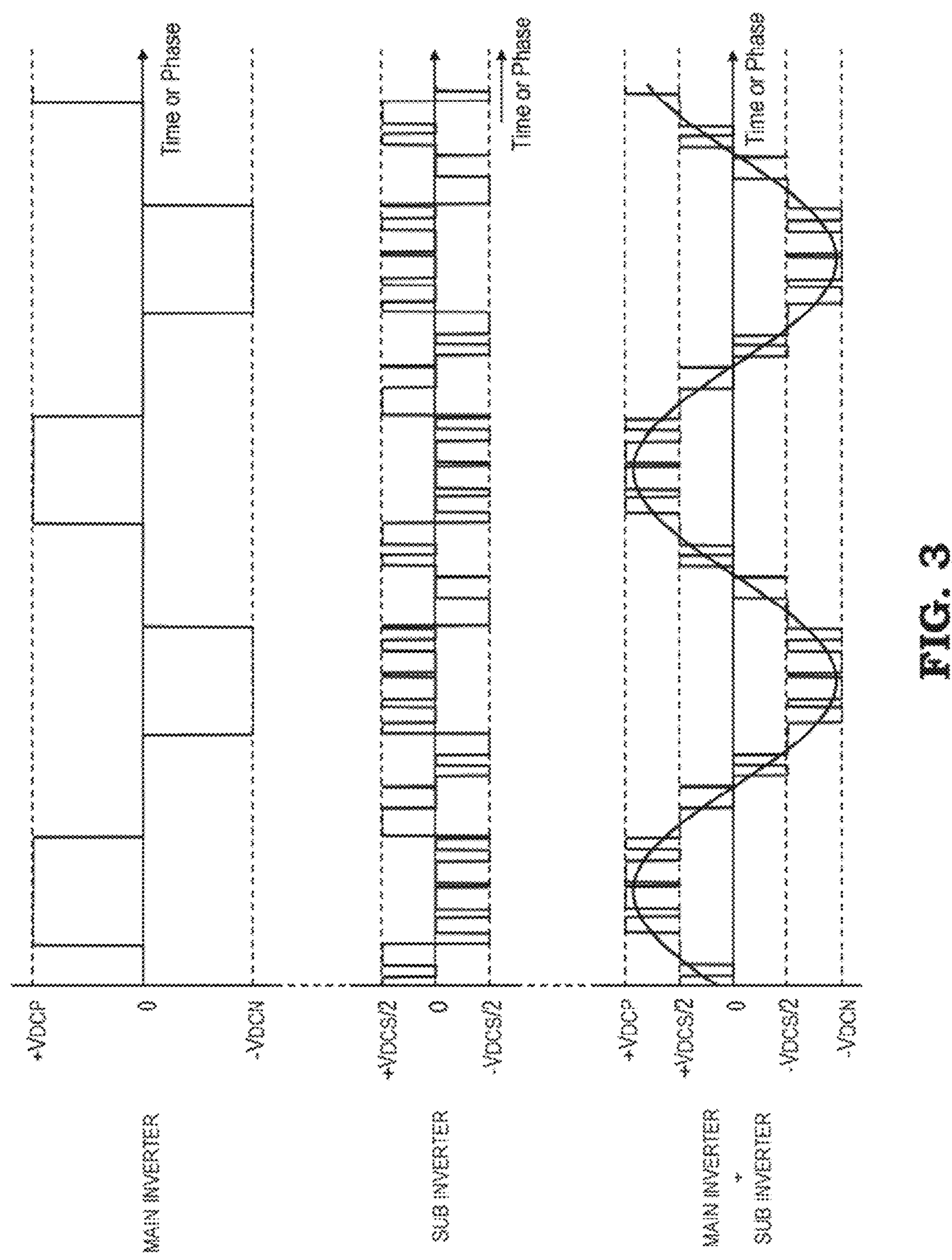
FIG. 3 shows voltage waveforms at respective parts when the main inverter performs one-pulse operation in the power conversion device according to embodiment 1.

FIG. 3 shows an example of operation in a case where the controller 14 performs control so as to perform one-pulse operation of the main inverter 20 in order to output target voltage. In FIG. 3, voltage waveforms in the one-pulse operation for one of U phase, V phase, and W phase of the multilevel inverter 2 are shown. The other two phases have voltage waveforms whose phases are shifted by 120 degrees and 240 degrees from the voltage waveforms shown in FIG. 3. In FIG. 3, as in FIG. 2, the voltage waveform at the upper stage is a voltage waveform in which the neutral point potential of the main inverter 20 is a reference, i.e., the neutral point potential is voltage 0. The voltage waveform at the middle stage is a voltage waveform between the input end and the output end of the sub inverter 30. Of the voltage waveforms at the lower stage, the step-shaped waveform is a voltage waveform at the output end of the sub inverter 30 with the neutral point potential as a reference, and the sine-curve waveform at the lower stage is a waveform of an output voltage command for the multilevel inverter 2. In the example shown in FIG. 3, $V_{DCS}=V_{DC}$ $(=V_{DCP}+V_{DCN})/4$ is assumed as in the example shown in FIG. 2.

The controller 14 performs one-pulse operation of the main inverter 20 having great capacitor voltages ($V_{DCP}$, $V_{DCN}$), so that the main inverter 20 outputs one-pulse voltage that is positive voltage and one-pulse voltage that is negative voltage in one cycle. Further, the controller 14 performs control so that the sub inverter 30 having small capacitor voltage ($V_{DCS}$) performs switching with a higher frequency than the main inverter 20. The sub inverter 30 outputs a difference between target voltage for the multilevel inverter 2 and output voltage of the main inverter 20. In the multilevel inverter 2, by the one-pulse operation of the main inverter 20, the number of times of switching is minimized and switching loss can be reduced, as compared to PWM operation. As shown in the output voltage waveform at the lowermost stage in FIG. 3, the multilevel inverter 2 can output multilevel voltages close to a sinewave even in a case where the main inverter 20 undergoes one-pulse operation. In FIG. 3, the output voltage of the multilevel inverter 2 has a 5-level waveform. However, control may be performed so that voltages of $V_{DC}+V_{DCS}/2$ and $-V_{DCP}-V_{DCS}/2$ can be outputted with the target voltage increased, whereby voltage having a waveform with 7 levels at maximum can be outputted.

The controller 14 can switch pulse operation of the main inverter 20 between the PWM operation and the one-pulse operation, in accordance with load power, the load frequency condition, or the like. For example, switchover between the PWM operation and the one-pulse operation is preferably performed such that the PWM operation is performed in a range approximately from a low load to a middle load where the current value is small and loss in the semiconductor switch is small, and the one-pulse operation is performed in a range from a middle load to a high load where the current value is great and loss in the semiconductor switch increases. If the one-pulse operation is performed in a condition in which the fundamental frequency is low and the target voltage is small as in a low load state, the capacitor voltages of the main inverter 20 are controlled with one-pulse voltage having a long cycle and a short pulse width, and accordingly, the capacitors of the main inverter 20 are likely to be increased in size in order to compensate for a discharge period. Therefore, in a case of a small load, the PWM operation is preferably used. However, switchover of the pulse operation in accordance with the load condition is not limited to the above manner, and the two pulse operations can be switched therebetween no matter what condition the load condition is.

Figure 4:
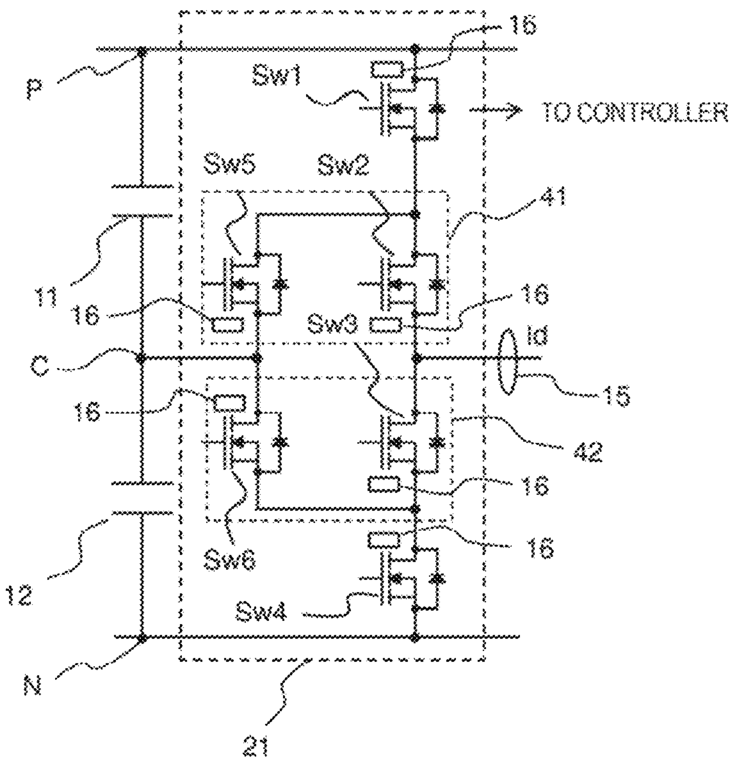
FIG. 4 is a circuit diagram showing the detailed configuration of the main inverter in the power conversion device according to embodiment 1.

Next, with reference to FIG. 4 showing an equivalent circuit for one phase of the main inverter 20, switching operation in a case where the main inverter 20 of the present embodiment outputs zero voltage which is the potential of the neutral point C, will be described. The switches each formed by a combination of a semiconductor switch and a FWD connected in antiparallel thereto in FIG. 4 are referred to as Sw1, Sw2, Sw3, Sw4, Sw5, and Sw6. Output voltages of the main inverter 20 at 3 levels are defined as $V_{DCP}$, $-V_{DCN}$, and zero voltage (neutral point potential), for convenience sake. A current detector 15 is provided for detecting phase current Id of the main inverter 20. Here, the current detector 15 is assumed to be a current transformer. However, the current detector 15 may be another type of current detector, e.g., a resistance detection type or a magnetic field detection type such as a Hall element. In FIG. 4, the current detector 15 is provided on the output side of the main inverter 20. However, the current detector 15 may be provided between the sub inverter 30 and the load. In a case where the output noise filter 13 is provided, current may be detected at either the input or the output of the output noise filter 13. Regarding current conduction in each switch formed of a semiconductor switch and a FWD connected in antiparallel to the semiconductor switch, there are a mode in which current is conducted on the semiconductor switch side and a mode in which current is conducted on the antiparallel connected FWD side, and in addition, in a case where gate voltage is applied (ON state) and drain current of the switch is negative, there is a mode in which the semiconductor switch and the FWD connected in antiparallel thereto both conduct currents. However, in the description of circuit operation, the mode in which the semiconductor switch conducts current and the mode in which the semiconductor switch and the FWD connected in antiparallel thereto both conduct currents are not discriminated from each other.

The circuit shown in FIG. 4 includes a first switch group 41 in which the switch Sw5 (which may be referred to as a first switch) and the switch Sw2 (which may be referred to as a second switch) are connected in series, and a second switch group 42 in which the switch Sw6 (which may be referred to as a third switch) and the switch Sw3 (which may be referred to as a fourth switch) are connected in series, and the first switch group 41 and the second switch group 42 are connected in parallel between the neutral point C and the output point of the main inverter. In addition, the switch Sw1 (which may be referred to as a fifth switch) is connected between the plus terminal P and a connection point at which the switch Sw5 (first switch) and the switch Sw2 (second switch) are connected, and the switch Sw4 (which may be referred to as a sixth switch) is connected between the minus terminal N and a connection point at which the switch Sw6 (third switch) and the switch Sw3 (fourth switch) are connected. It suffices that the first switch group 41 has a configuration in which at least the first switch Sw5 and the second switch Sw2 are connected in series, and another switch may be additionally provided in parallel or in series, or in series and parallel. It suffices that the second switch group 42 has a configuration in which at least the third switch Sw6 and the fourth switch Sw3 are connected in series, and another switch may be additionally provided in parallel or in series, or in series and parallel.

In a case of outputting zero voltage, the main inverter 20 can select various switching modes. Here, in a case of outputting zero voltage, a "loss-distributed switching mode" in which, among Sw1 to Sw6, loss can be uniformly distributed or loss can be selected in a concentrated manner, and a "current-split switching mode" in which conduction loss is reduced, can be selected.

First, the loss-distributed switching mode will be described. FIG. 5 shows ON/OFF of each switch with respect to the output voltage $V_{out}$ of the main inverter 20 in the loss-distributed switching mode. ON is indicated as 1, and OFF is indicated as 0. A symbol "Symbol" indicates switching modes, i.e., [+(PLUS)], [0o2], [0o1], [0u1], [0u2], and [−(MINUS)]. In the above symbol, "0" means that output voltage of the main inverter 20 is zero voltage, "o" denotes "over" which means a mode in which current flows in the first switch group 41 on the upper side at the time of zero voltage, and "u" denotes "under" which means a mode in which current flows in the second switch group 42 on the lower side at the time of zero voltage. [+]denotes a mode in which the output voltage is $V_{DCP}$, and [−] denotes a mode in which the output voltage is $-V_{DCN}$.

Figure 7:
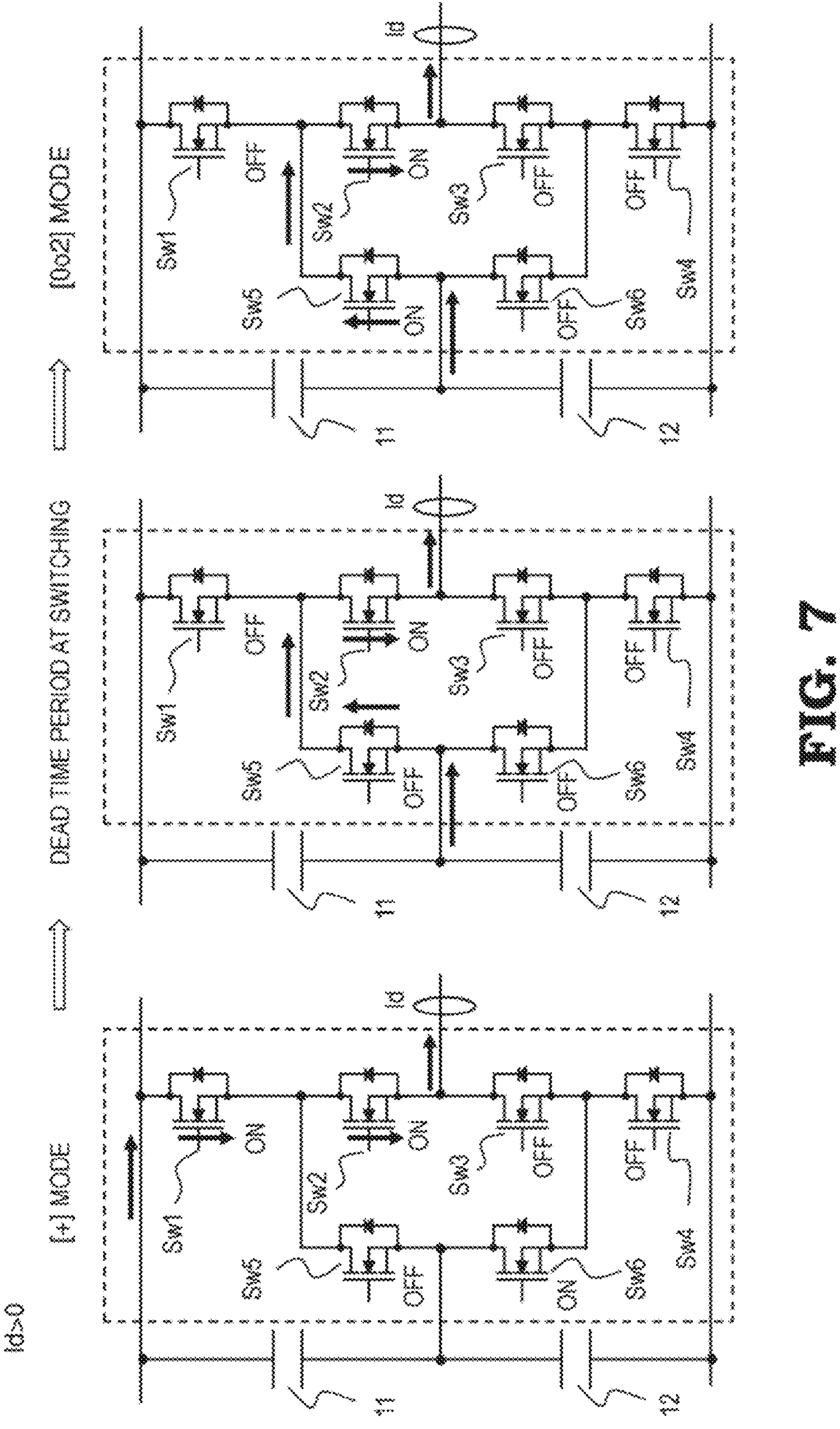
FIG. 7 is a first diagram showing operation of the main inverter in the power conversion device according to embodiment 1.
Figure 8:
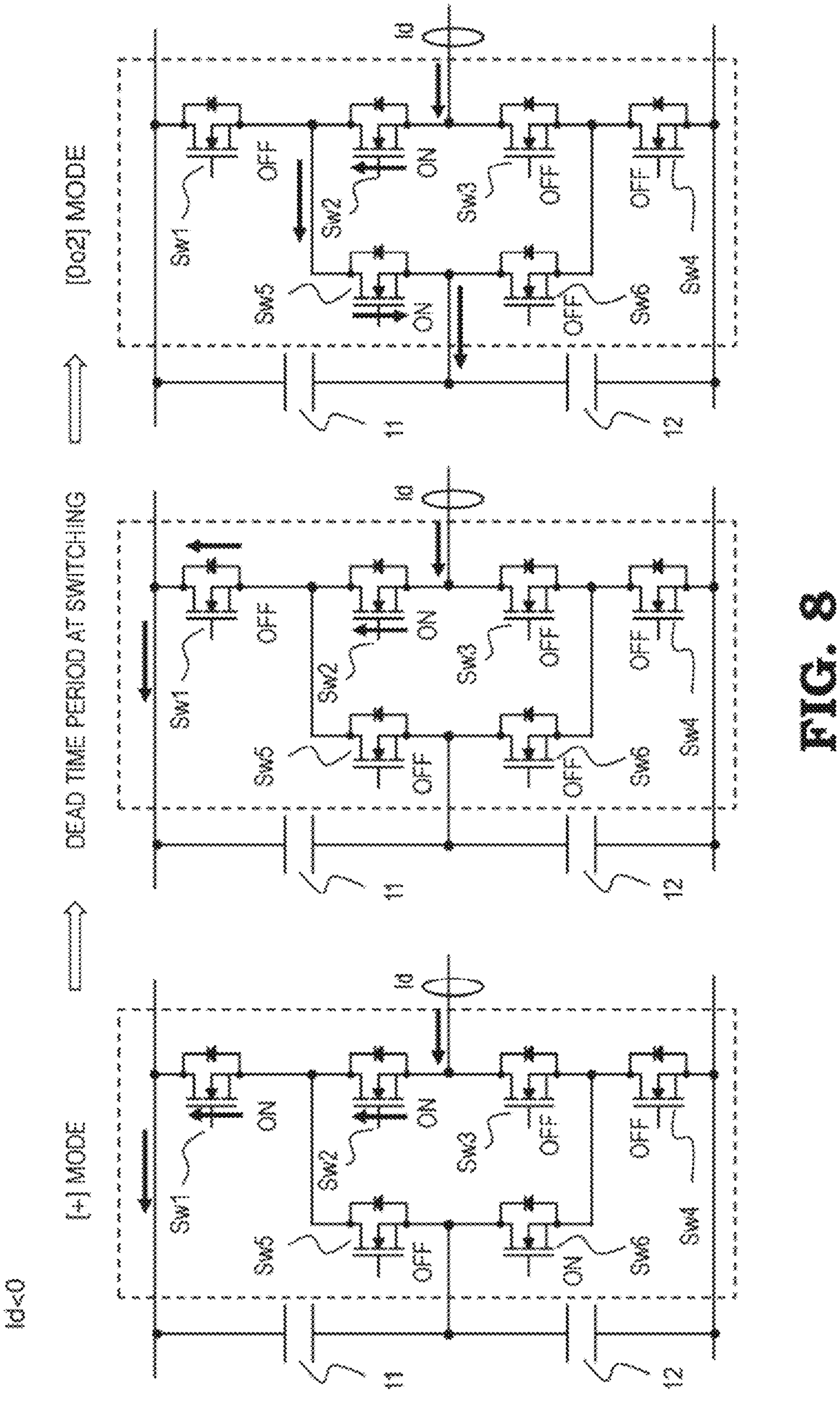
FIG. 8 is a second diagram showing operation of the main inverter in the power conversion device according to embodiment 1.
Figure 17:
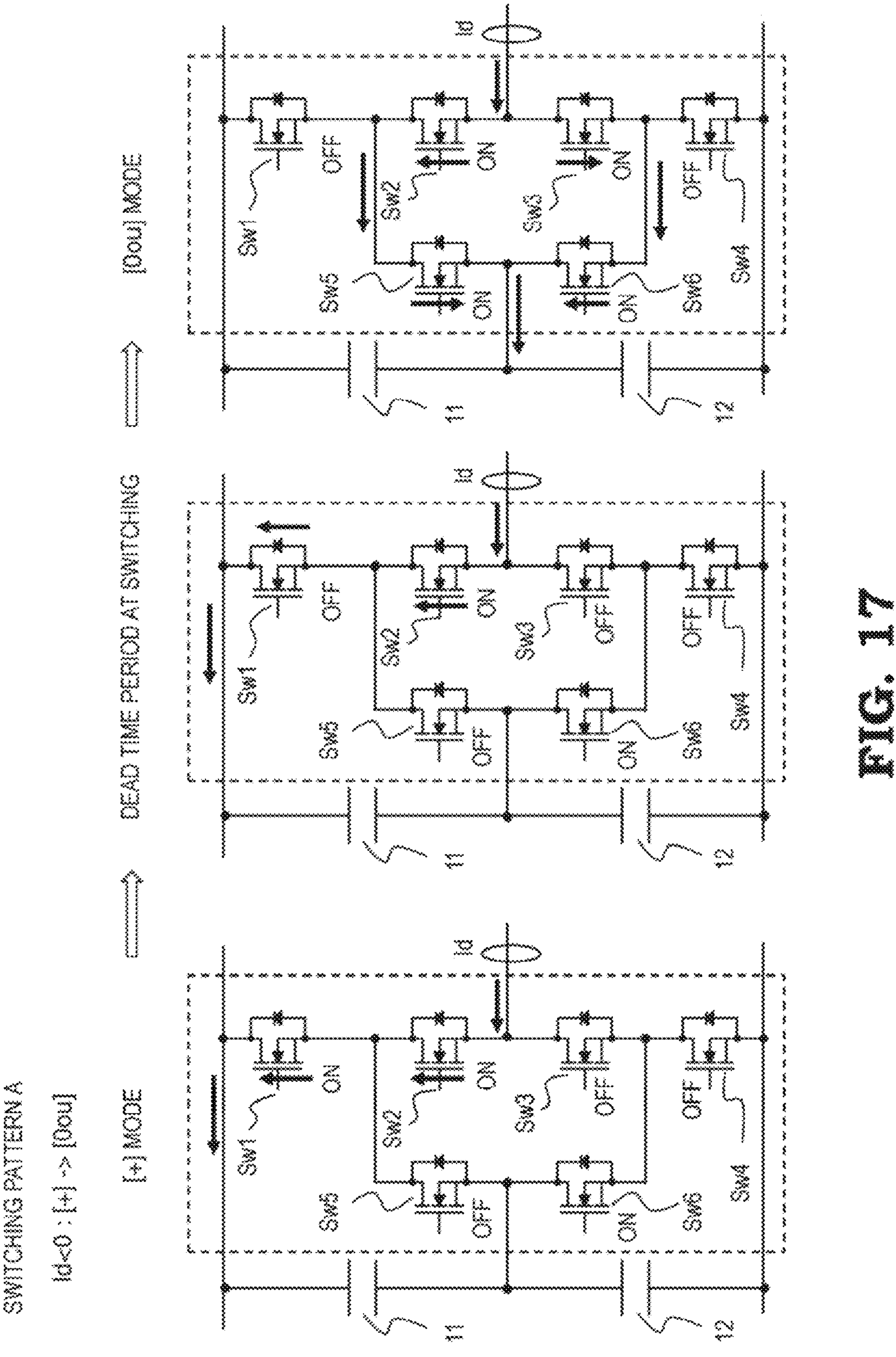
FIG. 17 is a third diagram showing operation in the switching pattern A of the main inverter in the power conversion device according to embodiment 1.

FIG. 6 shows a list of switchover losses due to switching in the loss-distributed switching mode. Conduction loss when a semiconductor switch conducts current, other than switchover loss, is omitted. A symbol "<−>" denotes mode switchover. Id denotes the positive/negative direction of the output current for each phase. In FIG. 6, in Sw1 to Sw6, the semiconductor switches are denoted by T1 to T6, the FWDs are denoted by Di1 to Di6, and their respective losses are shown. Sw_loss denotes loss due to turn-on or turn-off switching, and Di_loss denotes loss due to forward-direction voltage of the diode during a dead time period of the inverter. As an example, FIG. 7 shows mode switchover from [+] to [0o2] in a case of Id>0 in the loss-distributed switching mode, to describe switchover loss. In addition, FIG. 8 shows mode switchover from [+] to [0o2] in a case of Id<0, to describe switchover loss. Switchover losses in the other cases of mode switchover are in accordance with the following description and therefore will not be described.

In the [+] mode in FIG. 7, Sw1, Sw2, and Sw6 are turned on and Sw3, Sw4, and Sw5 are turned off, whereby the output voltage $V_{DCP}$ is outputted. Current flows through the semiconductor switches of Sw1 and Sw2 in the positive direction of Id. Next, in a dead time period for preventing arm short-circuit before switchover to the [0o2] mode, Sw1 and Sw6 are changed from ON to OFF (here, it is preferable that Sw6 is turned off and then Sw1 is turned off, so as not to increase switchover loss). In the dead time period, current is commutated so that current flows through the FWD of Sw5 and the semiconductor switch of Sw2 in the positive direction of Id. At this time, in Sw1, hard switching operation is performed, so that switching loss Sw_loss occurs. In addition, since current is conducted in the FWD of Sw5, loss Di_loss due to the forward-direction voltage occurs. Next, in the [0o2] mode, Sw5 is changed from OFF to ON. At this time, voltage applied across Sw5 is almost equal to zero, so that zero voltage switching is performed and therefore it is assumed that loss due to switchover does not occur. In this mode, current flows through the semiconductor switches of Sw5 and Sw2 in the positive direction of Id. In a case of mode switchover from [0o2] to [+], losses in turning on and turning off are different but similar losses occur in the switches.

Next, in the [+] mode in FIG. 8, Sw1, Sw2, and Sw6 are turned on and Sw3, Sw4, and Sw5 are turned off, whereby the output voltage $V_{DCP}$ is outputted. Current flows through the semiconductor switches of Sw1 and Sw2 in the negative direction of Id. Next, in a dead time period for preventing arm short-circuit before switchover to the [0o2] mode, Sw1 and Sw6 are changed from ON to OFF. In the dead time period, current flows through the FWD of Sw1 and the semiconductor switch of Sw2 in the negative direction of Id. At this time, in Sw1, since current is conducted in the FWD of Sw5, loss Di_loss due to forward-direction voltage occurs. Next, in the [0o2] mode, Sw5 is changed from OFF to ON. At this time, hard switching is performed in Sw5 and therefore switching loss occurs. In this mode, current is commutated, so that current flows through the semiconductor switches of Sw5 and Sw2 in the negative direction of Id. As shown in FIG. 7 and FIG. 8, irrespective of the direction of current Id, in mode switchover from [+] to [0o2], current can be assuredly commutated to the route on the upper side (first switch group), through the same switching operation. Similarly, also in the other modes, irrespective of the direction of current Id, current can be assuredly commutated to the route on the upper side (first switch group) or the lower side (second switch group).

As shown in FIG. 6, the direction of current Id and switching operation for outputting zero voltage are selected, whereby switchover loss occurring in each switch can be changed. Therefore, in the loss-distributed switching mode, it is possible to control a loss balance by selecting switchover loss occurring in each switch. Thus, for example, through analysis, actual device evaluation, or the like, switching operation for outputting zero voltage in the operation mode of a load or the like may be selected in advance so that element losses in the switching elements are equalized or heat generation is concentrated, thus controlling the temperature. Meanwhile, in a case of performing temperature control with high accuracy, as shown in FIG. 4, Sw1 to Sw6 may be provided with temperature sensors 16 such as thermistors, and the controller 14 may perform control while changing switching operation for outputting zero voltage, during operation, so that losses in the switches are equalized or concentrated, on the basis of the values of temperatures detected by the temperature sensors 16. The temperature sensors 16 may not necessarily be provided to all the switches, and the temperature of the switch to which the temperature sensor 16 is not provided may be estimated on the basis of the provided temperature sensors 16, duty information about the switches, and the like. Regarding mode switchover for zero voltage shown in FIG. 6, all patterns may be used or only some of them may be used, to perform control.

Next, the current-split switching mode will be described. In the present disclosure, as switching operation for outputting zero voltage, the controller 14 turns on Sw2, Sw3, Sw5, and Sw6 so that current flowing between the sub inverter 30 and the neutral point between the two series capacitors 11, 12 flows to split to the upper side and the lower side, i.e., flows through the first switch group 41 and the second switch group 42 at the same time. Sw1 and Sw4 are turned off. The semiconductor switch has an ON resistance characteristic that the ON resistance increases as current increases, and therefore, it is possible to reduce the ON resistance by splitting current into two routes and reducing the current value to be halved. Further, since the current value can be halved by splitting current, conduction loss due to ON voltage and current can be reduced. However, although conduction loss can be reduced in the current-split switching mode, switchover loss occurs as described in the loss-distributed switching mode.

In a case where the main inverter 20 outputs zero voltage which is the potential at the neutral point, it can be said that, in the current-split switching mode, control is performed so that current flows through the first switch group 41 and the second switch group 42 at the same time, whereas in the loss-distributed switching mode, current flows through only one of the first switch group 41 and the second switch group 42.

FIG. 9 shows a switching pattern A in the current-split switching mode, and FIG. 10 shows a switching pattern B in the current-split switching mode. A symbol "Symbol" in the switching pattern A indicates [+], [−], and [0ou], and a symbol "Symbol" in the switching pattern B indicates [+" ], [−" ], and [0ou]. FIG. 11 and FIG. 12 show switchover loss in commutation in a case of controlling the main inverter 20 so as to split current at the time of zero voltage, in the switching pattern A and the switching pattern B, respectively. FIG. 13, FIG. 15, FIG. 17, and FIG. 19 show commutation operation in a case of switchover from [+], [−] to zero voltage in the current-split switching mode in the switching pattern A. FIG. 14, FIG. 16, FIG. 18, and FIG. 20 show commutation operation in a case of switchover from [+" ], [−" ] to zero voltage in the current-split switching mode in the switching pattern B. Description of switchover from zero voltage to [+], [−] or [+" ], [−"] is omitted.

Figure 21:
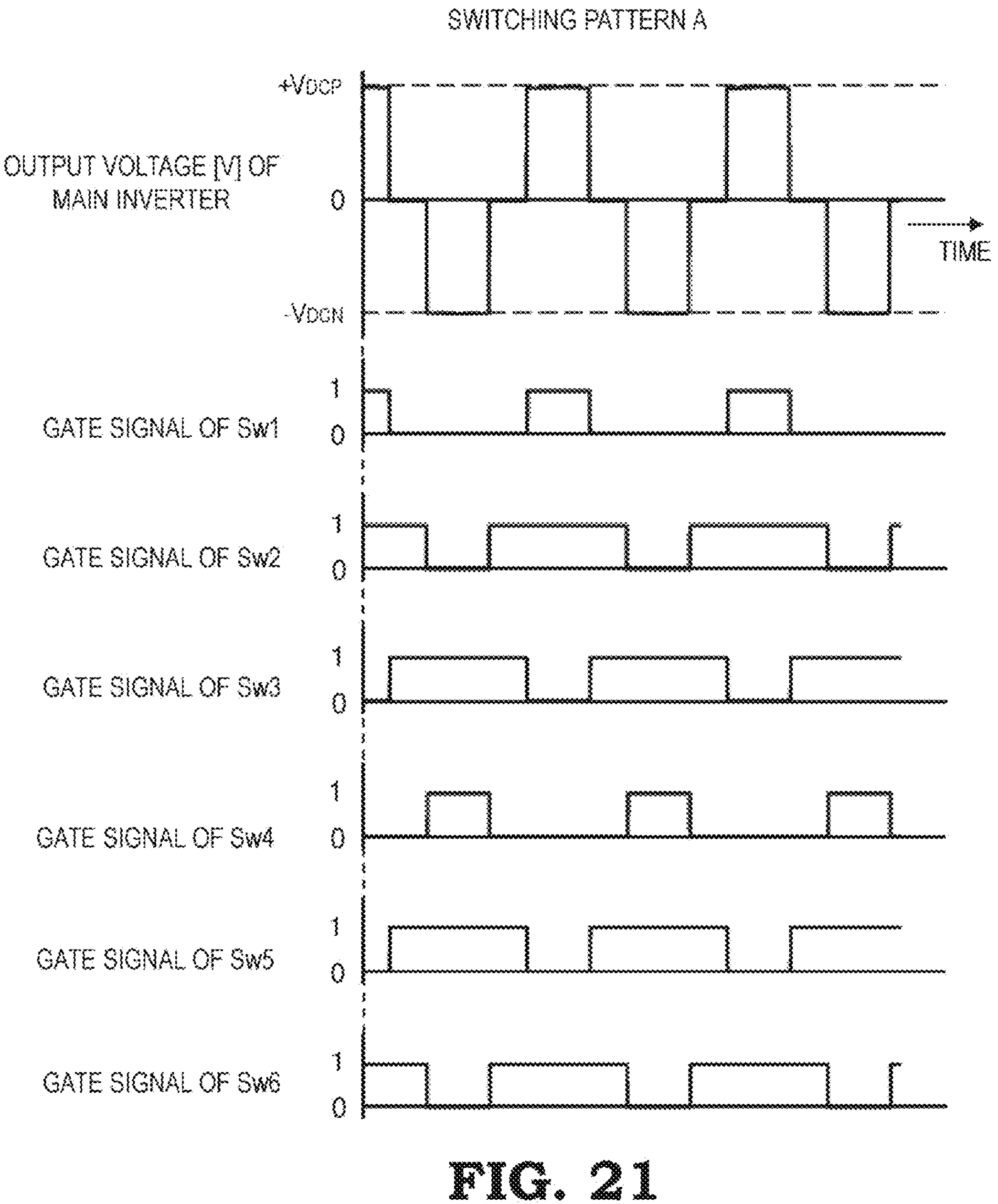
FIG. 21 is a diagram showing operation of each switch in the switching pattern A of the main inverter in the power conversion device according to embodiment 1.
Figure 22:
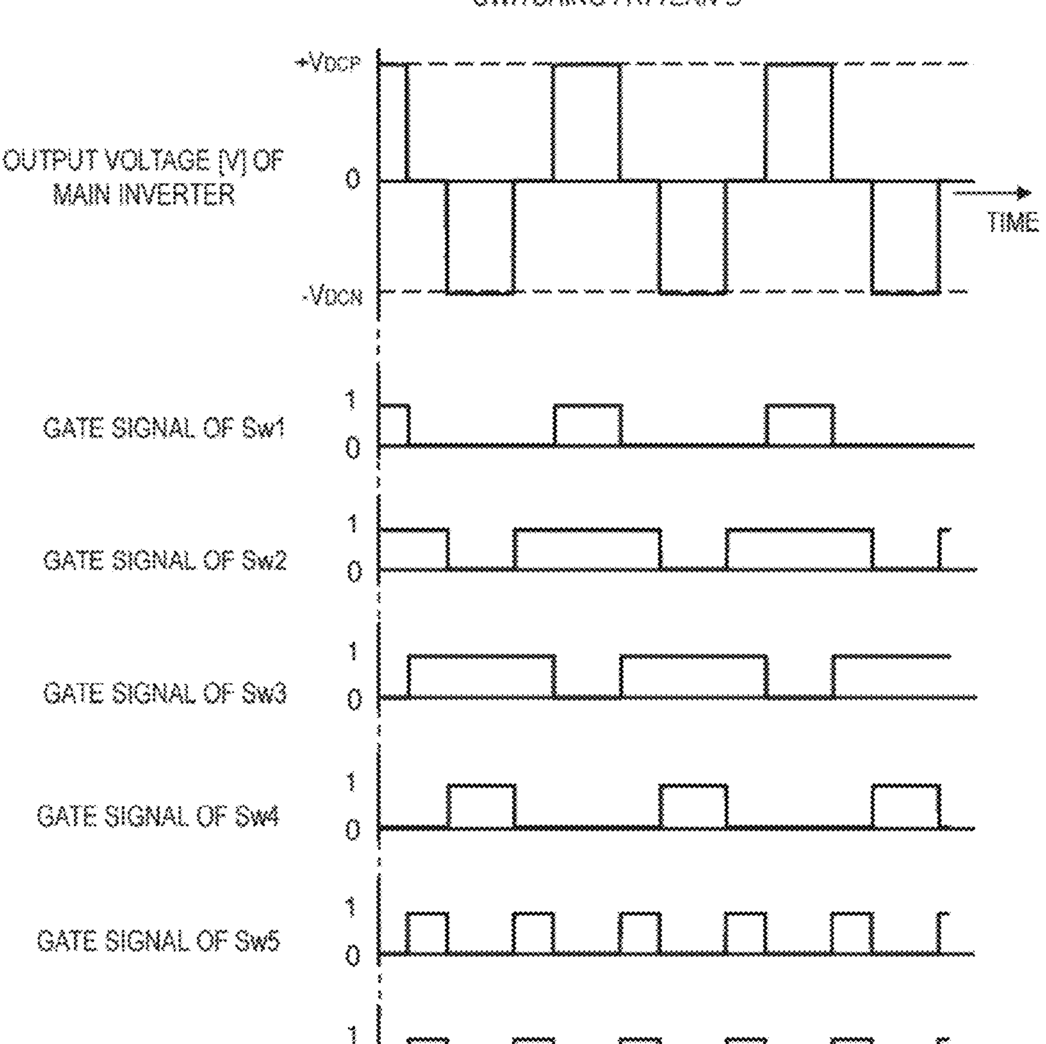
FIG. 22 is a diagram showing operation of each switch in the switching pattern B of the main inverter in the power conversion device according to embodiment 1.

Difference between the switching pattern A and the switching pattern B is that, in cases of output voltage $V_{DCP}$ and output voltage $V_{DCN}$ of the main inverter 20, ON/OFF patterns of the switching elements are different, and accordingly, switchover losses that occur are also different. In addition, the switching pattern B has, in a dead time period, a mode in which current flows on one side. FIG. 21 and FIG. 22 show voltage (one-pulse voltage) of the main inverter 20 and gate signal waveforms at the switches, in the switching pattern A and the switching pattern B, respectively. In comparison between FIG. 21 and FIG. 22, it can be found that, in the switching pattern A, the numbers of times of ON/OFF switching of Sw5 and Sw6 in one cycle can be made smaller than in the switching pattern B and thus switching loss can be reduced. In both of the switching pattern A and the switching pattern B, in the [0ou] mode, current flows so as to split. Here, in comparison with switchover loss symbols shown in the loss-distributed switching mode in FIG. 6, difference in loss symbols shown in FIG. 11 and FIG. 12 will be described.

Sw_loss2 denotes loss in a case of performing switching with current approximately halved because current is split while voltage is equal, as compared to Sw_loss. Sw_loss3 denotes loss in performing switching with current approximately halved and voltage reduced to ⅓, as compared to Sw_loss. For example, on the P side, regarding the voltage $V_{DCP}$, a circuit is formed such that Sw1 is connected in series to a parallel circuit of Sw2 and Sw5, and therefore, under the assumption that the switches have the same impedance, the ratio of divided voltage applied to each of Sw2 and Sw5 is approximately ⅓ and the ratio of divided voltage applied to Sw1 is approximately ⅔. Therefore, the magnitude order of switching losses is Sw_loss>Sw_loss2>Sw_loss3. On the other hand, Di_loss2 denotes loss due to forward-direction voltage based on current approximately halved because current is split, as compared to Di_loss. The forward-direction voltage increases as current increases, and therefore, when current is decreased, the forward-direction voltage is decreased, so that loss is reduced. Thus, the magnitude order of losses due to diodes is Di_loss>Di_loss2.

The controller 14 can reduce conduction loss by performing control so as to split current to be halved at the time of zero voltage, but it is found that, as compared to the loss-distributed switching mode, switchover loss at the time of zero voltage is equal or decreases in the switching pattern A and is equal or slightly increases in the switching pattern B. However, in the current-split switching mode in actual operation, current becomes uneven and there are many parts where losses occur as compared to the loss-distributed switching mode. Therefore, if there are many parts where switching is performed, the actual result might not coincide with ideal calculation and switchover loss might not necessarily be reduced. Accordingly, it is preferable that the current-split switching mode is applied in a case where the number of times of switching is obviously small as in the one-pulse operation as compared to the PWM operation in which the number of times of switching is large. As a matter of course, the current-split switching mode may be applied in the PWM control, though the improvement effect may be small.

In each switch, due to a semiconductor element characteristic with respect to load current or a switching characteristic based on gate resistance, the influence of switching loss can be greater than that of conduction loss. Therefore, if the current-split switching mode is selected in the PWM operation, there is a possibility that switchover loss increases and the entire loss increases.

Figure 23:
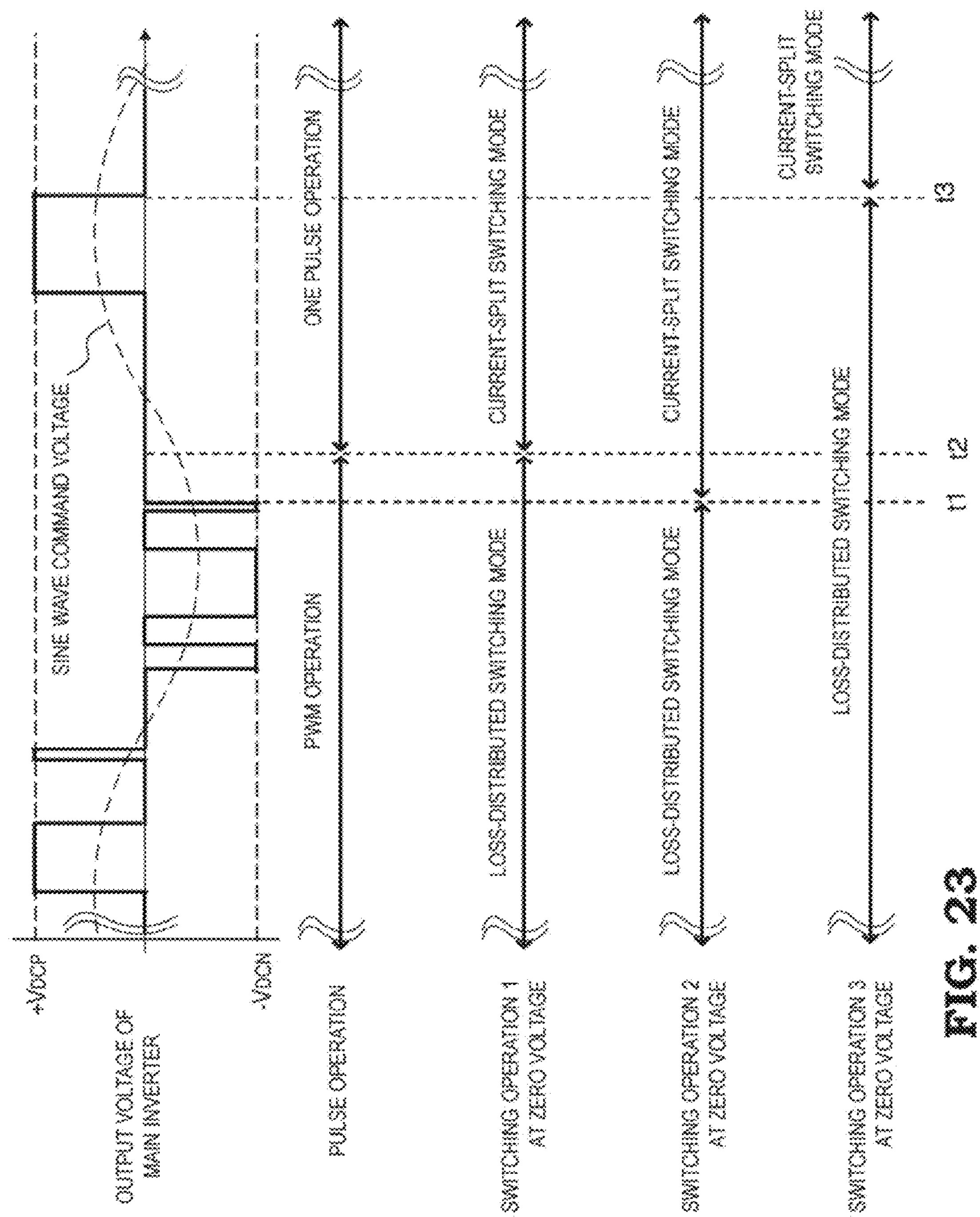
FIG. 23 is a diagram illustrating switchover of operation of the main inverter in the power conversion device according to embodiment 1.

Therefore, as shown in a "switching operation 1 at the time of zero voltage" in FIG. 23, it is desirable that the controller 14 switches from the loss-distributed switching mode in the PWM operation to the current-split switching mode in the one-pulse operation, at a timing t2 of switching between the PWM operation and the one-pulse operation on the basis of the condition of the load or the like, so as to reduce the entire loss in the one-pulse operation. However, if switchover from the loss-distributed switching mode to the current-split switching mode is performed while zero voltage is being continuously outputted, switchover loss for one time occurs. Therefore, switchover from the loss-distributed switching mode to the current-split switching mode may be performed before the above timing ("switching operation 2 at the time of zero voltage" in FIG. 23), or at an immediately subsequent timing of becoming zero voltage ("switching operation 3 at the time of zero voltage" in FIG. 23).

As compared to the loss-distributed switching mode described above, in the current-split switching mode, the number of patterns in which losses in the switches are distributed is small and therefore a loss balance among the switches might be lost. Therefore, for example, in the current-split switching mode, control may be performed so that losses in Sw2, Sw3, Sw5, and Sw6 are distributed by such a control method that current on the upper side or the lower side is stopped and current flows on one side or by splitting current using a diode mode in which some of Sw2, Sw3, Sw5, and Sw6 are turned from ON to OFF, though switchover loss or the like increases.

Next, further reduction in the size and the weight of a cooler will be described. Among the switches, the first switch Sw5 and the third switch Sw6 merely conduct current in a flyback mode through the semiconductor switch or the FWD connected in antiparallel thereto at the time of zero voltage. Therefore, losses in Sw5 and Sw6 can be reduced as compared to losses in Sw1, Sw2, Sw3, and Sw4 which supply also positive voltage or negative voltage. In addition, as compared to the one-pulse operation, in the PWM operation, the number of times of switching is large and therefore switching loss might increase. Further, in the PWM operation, in a case of outputting a plurality of pulses in one cycle, current conduction is performed a plurality of times at a part where current is large, and therefore conduction loss increases, so that (losses in Sw5 and Sw6 in PWM operation)>(losses in Sw5 and Sw6 in one-pulse operation) is satisfied. As described above, in a case where current is large in a range from a middle load to a high load, the main inverter 20 undergoes one-pulse operation so as to reduce switching loss and the current-split switching mode is selected at the time of zero voltage, whereby losses in Sw5 and Sw6 can be made as small as possible. On the other hand, in a case of performing the PWM operation at the time of starting or in a range from a low load to a middle load, the current value is small and therefore losses in Sw5 and Sw6 can be kept small. In some cases, if losses in Sw5 and Sw6 are somewhat large though the current value is small, a period in which the PWM operation is performed may be set to be short at the time of starting or in a range from a low load to a middle load. For example, a period in which the PWM operation is performed may be set to be shorter than a time constant until reaching a tolerable temperature of switches due to heat generation. Thus, losses occurring in Sw5 and Sw6 can be made small enough that a cooler is not needed (no heat sink) throughout a series of operations from starting to rated operation.

Figure 24:
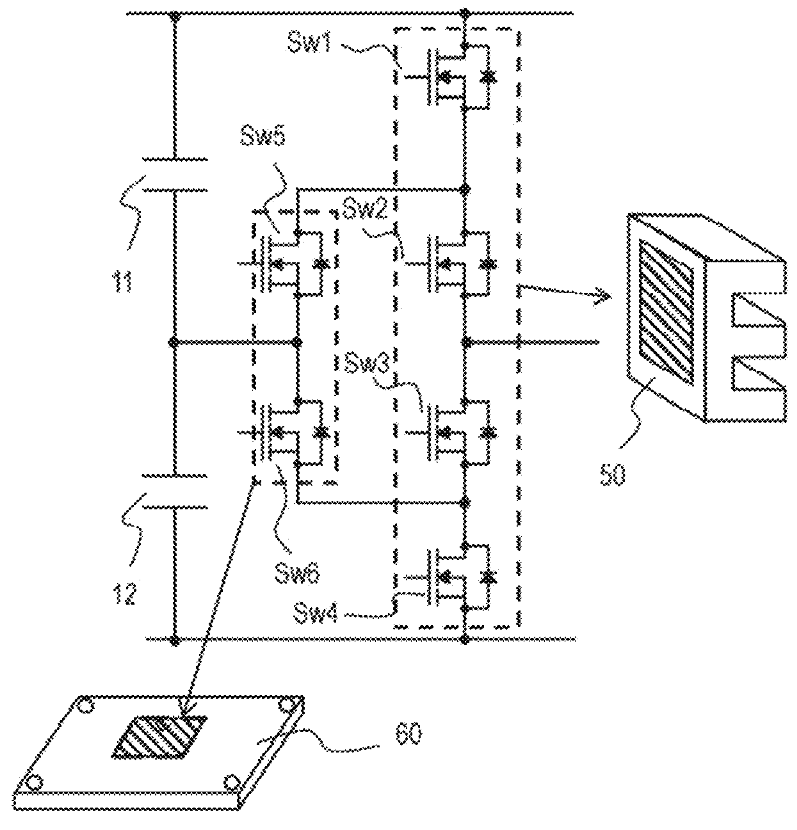
FIG. 24 shows an example of arrangement of the switches of the main inverter in the power conversion device according to embodiment 1.
Figure 25:
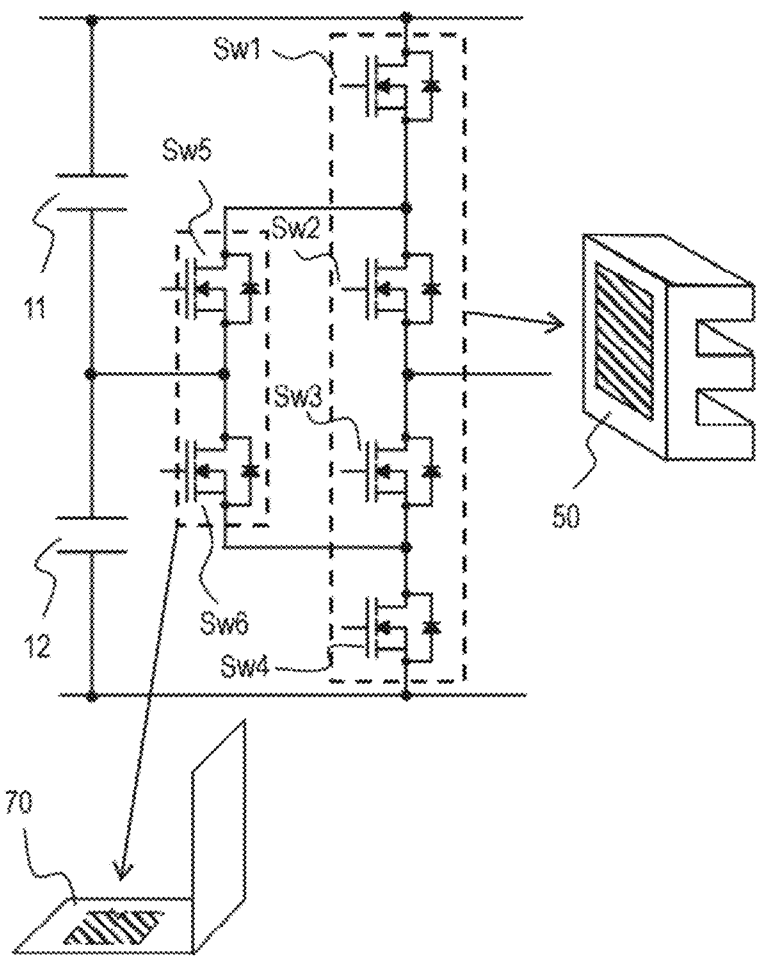
FIG. 25 shows another example of arrangement of the switches of the main inverter in the power conversion device according to embodiment 1.

FIG. 24 and FIG. 25 show examples of places where the switches are physically attached. As described above, loss and heat generation in Sw5 and Sw6 are less as compared to Sw1, Sw2, Sw3, and Sw4. Accordingly, Sw1, Sw2, Sw3, and Sw4 may be attached to a cooler such as a heat sink for cooling, and at least one of Sw5 and Sw6 may be attached to another member (hereinafter, referred to as attachment member) having lower cooling performance than the cooler 50. The attachment member is a member having lower cooling performance than the heat sink because the attachment member has a lower thermal conductivity or a higher thermal resistance than the heat sink. In the example shown in FIG. 24, as the attachment member, a board 60 for element fixation is used, Sw1, Sw2, Sw3, and Sw4 are attached to the heat sink 50 which is the cooler, and Sw5 and Sw6 are attached to the board 60 which is the attachment member. In the example shown in FIG. 25, as the attachment member, a housing 70 for storing the power conversion device 1 is used, Sw1, Sw2, Sw3, and Sw4 are attached to the heat sink 50, and Sw5 and Sw6 are attached to the housing 70.

Since heat generation in Sw5 and Sw6 is less, the heat can be dissipated even if the attachment member having low cooling performance is used. Thus, the size of the heat sink can be reduced or the number of heat sinks can be decreased, as compared to a case where all of Sw1, Sw2, Sw3, Sw4, Sw5, and Sw6 are attached to a heat sink. As the attachment member, a small-sized (thin-sized) board 60 or an existing housing 70 may be used. Thus, cooling members provided to the power conversion device 1 can be reduced in size and weight as a whole.

In a state in which Sw1, Sw2, Sw3, Sw4, Sw5, and Sw6 are attached to the attachment member, Sw1, Sw2, Sw3, and Sw4 may be attached also to the cooler such as a heat sink, and Sw5 and Sw6 which generate less heat may be attached to only the attachment member without being attached to the cooler. One of Sw5 and Sw6 may be attached also to the cooler such as a heat sink, and the other one may be attached to only the attachment member. As the attachment member, metal connecting to the heat sink 50 or the housing 70 so as to allow transfer of heat may be used.

Sw1, Sw2, Sw3, Sw4, Sw5, and Sw6 may be connected via a busbar (also called bus bar) and may be cooled using the busbar as the attachment member. At least one of Sw5 and Sw6 may be attached to the attachment member, and the other switches including Sw1, Sw2, Sw3, and Sw4 may be directly cooled by water, instead of indirect cooling by a heat sink.

As described above, the power conversion device according to embodiment 1 includes the main inverter 20 connected to the DC source and capable of multilevel output, the sub inverter 30 connected in series to the main inverter 20 and connected to the load side, and the controller 14 for controlling the main inverter 20 and the sub inverter 30. In the main inverter 20, two switch groups 41 and 42 in each of which at least two switches each composed of a switching element and a diode are connected in series are connected in parallel between the sub inverter 30 and the neutral point C between the intermediate capacitors 11, 12. The controller 14 switches the main inverter 20 between the PWM operation and the one-pulse operation, and in a case where the main inverter 20 outputs zero voltage in the one-pulse operation, controls the switching elements so that current flowing between the neutral point C and the sub inverter 30 flows through the two switch groups 41 and 42 at the same time. With this configuration, switching loss is reduced owing to the one-pulse operation, and in addition, conduction loss is reduced owing to the current-split operation, whereby loss can be significantly reduced. Since efficiency is enhanced and loss is reduced, the cooler can be reduced in size and weight, and the noise filter can be formed to be small, thus providing an effect that the multilevel inverter 2 of a type in which voltage of the sub inverter 30 is added or subtracted to or from output voltage of the main inverter 20 can be formed with its size and weight further reduced. Further, since loss is reduced, a configuration in which the first switch Sw5 and the third switch Sw6 are cooled in a state of being attached to the attachment member can be employed, whereby the heat sink for cooling the first switch Sw5 and the third switch Sw6 can be reduced, thus providing an effect that the multilevel inverter 2 can be formed with its size and weight even more reduced.

Embodiment 2

In embodiment 1, in a case where the operation condition of the load is in a range from a middle load to a high load, loss is great, and therefore, in order to reduce loss, it is preferable that not only the one-pulse operation is used but also the current-split switching mode is selected at the time of zero voltage. The current-split switching mode is means for achieving loss reduction among others, and therefore might cause a loss balance among the switches to be uneven, thus worsening temperature distribution among the switches. Since the temperature distribution is worsened, placement of the cooler for cooling the power conversion device might be subject to predetermined constraints, or the size of the cooler or the like might need to be increased in order to cool a predetermined switch on which heat is concentrated. Therefore, it is also important to distribute losses. In embodiment 2, a method for performing loss reduction and loss distribution by cyclically switching between the current-split switching mode and the loss-distributed switching mode will be described. Description equivalent to that in embodiment 1 is omitted.

Figure 26:
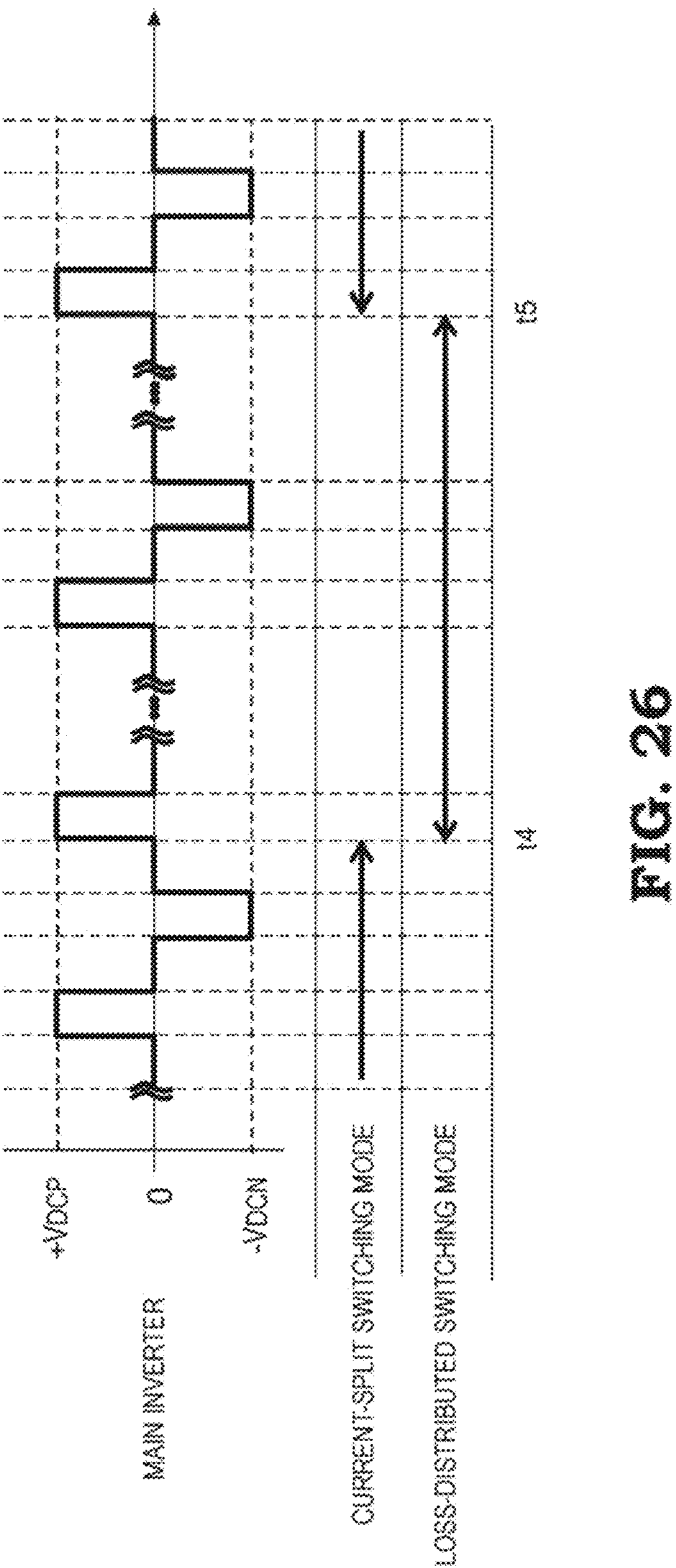
FIG. 26 is a diagram illustrating operation of a main inverter in a power conversion device according to embodiment 2.
Figure 27:
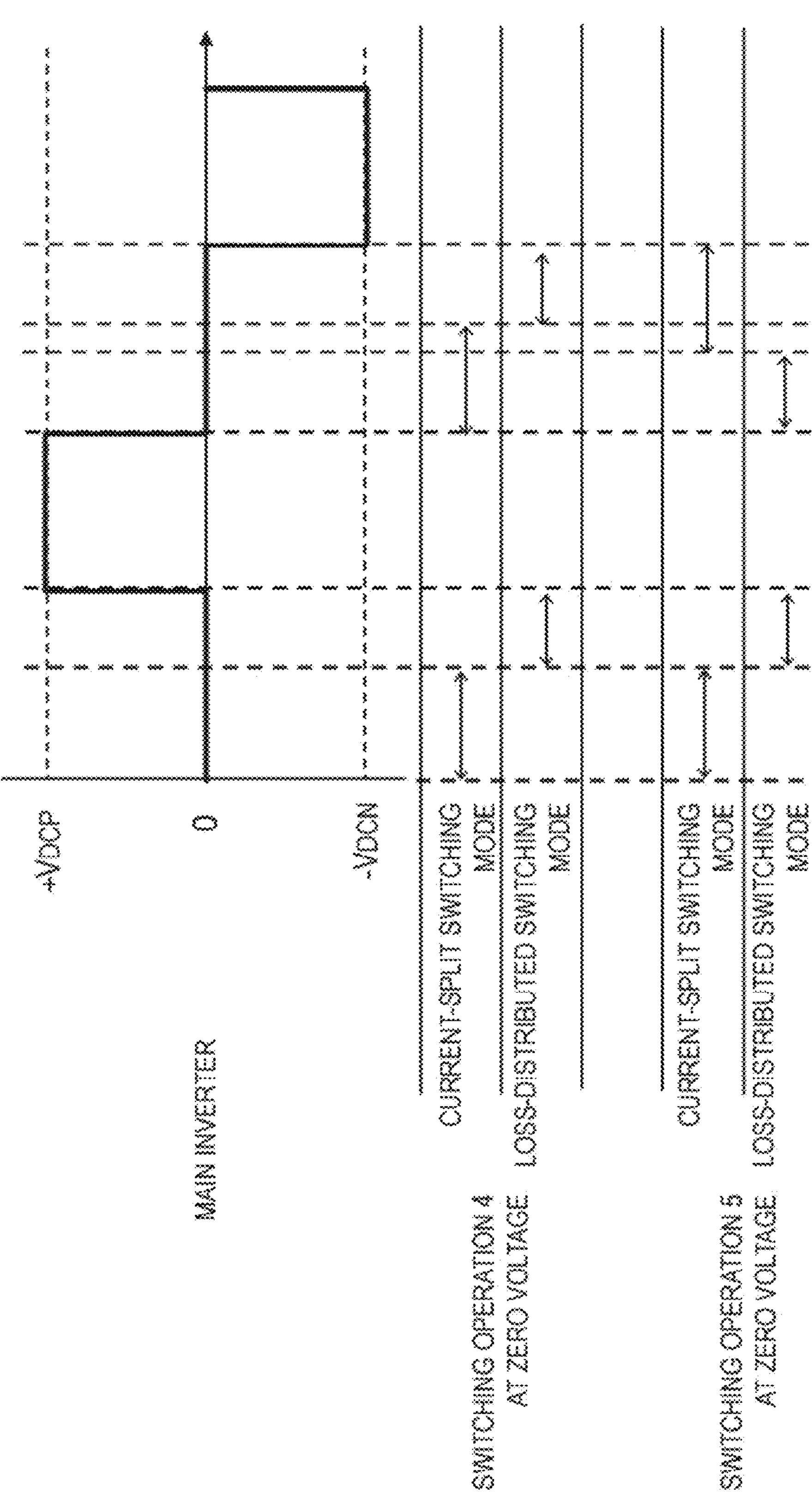
FIG. 27 is a diagram illustrating another operation of the main inverter in the power conversion device according to embodiment 2.

FIG. 26 shows timings of switching between the current-split switching mode and the loss-distributed switching mode at the time of zero voltage in a one-pulse operation waveform. The controller 14 cyclically performs switchover so as to execute the current-split switching mode until time t4, the loss-distributed switching mode from time t4 to time t5, and the current-split switching mode after time t5. Here, the switchover cycle may be a long cycle corresponding to a plurality of cycles of the fundamental frequency of the inverter, for example. Although switchover is performed at timings of $V_{DCP}$ at time t4 and time t5 in FIG. 26, switchover timings are not limited thereto. Switchover may be performed at any timing when zero voltage is outputted, as long as switchover is cyclically performed. For example, as shown in FIG. 27, in an instantaneous zero voltage period when the output voltage of the main inverter changes as in $V_{DCP}$->zero voltage->$-V_{DCN}$, the current-split switching mode and the loss-distributed switching mode may be switched at a time ratio as shown in a "switching operation 4 at the time of zero voltage" or a "switching operation 5 at the time of zero voltage".

Regarding setting of the time ratio of the current-split switching mode and the loss-distributed switching mode, selection of current-split switching and loss-distributed switching with respect to the operation mode of the load or the like may be calculated and set in advance so that losses in the switches become close to an equalized state, through analysis, actual device evaluation, or the like. With a temperature sensor provided to each switch, the time ratio may be changed on the basis of temperature information of the switches, or switchover may be performed such that the loss-distributed switching mode is applied at a predetermined timing with respect to the current-split switching mode so that the temperatures of the switches are distributed, on the basis of temperature information of the switches. It is not necessary to provide temperature sensors to all the switches. The temperature of the switch to which a temperature sensor is not provided may be estimated from provided temperature sensors, duty information about the switches, and the like.

The loss-distributed switching mode with respect to the current-split switching mode described above may be applied so that losses in the switches are equalized or so that loss in a predetermined switch in which loss is small in the current-split switching mode is increased and loss in a predetermined switch in which loss is great in the current-split switching mode is decreased.

Thus, while loss is reduced in the current-split switching mode, the switching mode is cyclically switched to the loss-distributed switching mode so as to reduce unevenness of a loss balance, whereby the temperature distribution can be improved. It is noted that the loss reduction effect by the current-split switching mode is reduced in accordance with the period in which the loss-distributed switching mode is applied.

As described in embodiment 1, the method of applying the current-split switching mode in the one-pulse operation under a condition from a middle load to a high load is especially effective as a method for reducing loss. Therefore, it is desirable that the current-split switching mode and the loss-distributed switching mode are cyclically switched in the one-pulse operation so as to perform loss reduction and loss distribution. As a matter of course, the current-split switching mode and the loss-distributed switching mode may be cyclically switched in the PWM operation, although the effect may be low.

As described above, the current-split switching mode and the loss-distributed switching mode are cyclically switched, whereby loss reduction and loss distribution can be performed, so that the cooler and the like can be reduced in size and weight, thus providing an effect of reducing the size and the weight of the multilevel inverter 2.

Embodiment 3

The present embodiment relates to a flying object 100 including the power conversion device 1 according to embodiment 1 or 2. The flying object 100 of the present embodiment is, for example, an airplane, a helicopter, a drone, or a flying vehicle.

Figure 28:
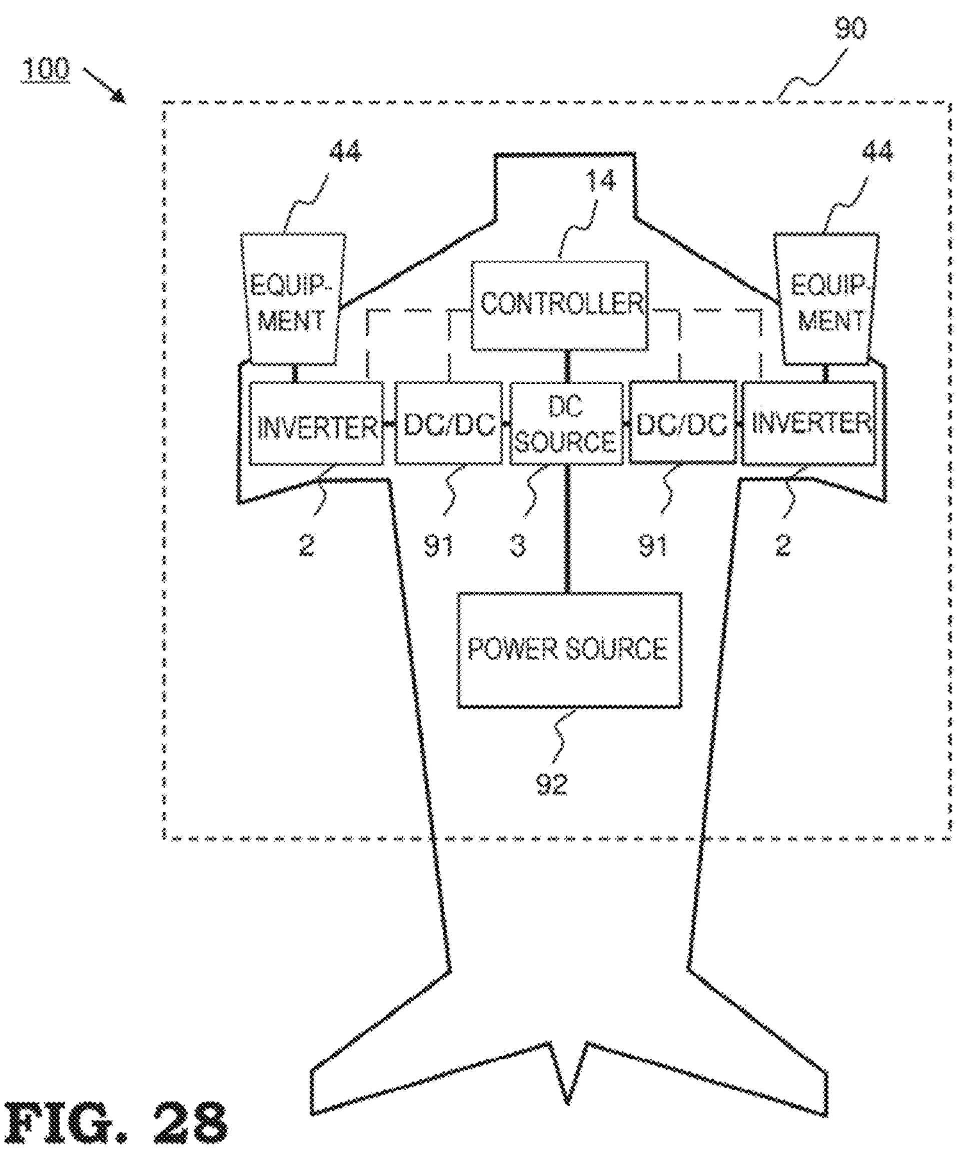
FIG. 28 is a block diagram showing the configuration of a flying object according to embodiment 3.

FIG. 28 is a schematic block diagram of the flying object 100 according to embodiment 3. The flying object 100 includes the power conversion device including the multilevel inverter 2 described in embodiment 1 or 2. The flying object 100 is an electric flying object, and includes, as a propulsion-related power system 90, a power source 92, the DC source 3 connected to the power source 92, a step-up, step-down, or step-up and step-down DC/DC converter 91 which is connected to the DC source 3 and performs conversion to predetermined voltage, the multilevel inverter 2 which converts DC power stepped up or stepped down by the DC/DC converter 91, to AC power, and equipment 44 which is a load of the multilevel inverter 2 and is supplied with power. The controller 14 controls the DC/DC converter 91 and the multilevel inverter 2. The controller 14 and the multilevel inverter 2 form the power conversion device 1 according to embodiment 1 or 2. The controller 14 may be provided inside the multilevel inverter 2, or may be provided to a device different from the multilevel inverter 2. The equipment 44 is equipment that uses power from the DC source 3. The equipment 44 is a propulsion-related load for obtaining a propulsion force, and includes, for example, an electric motor.

The multilevel inverter 2 of the power conversion device 1 according to embodiment 1 or 2 is used as the multilevel inverter 2 for an electric flying object, in the propulsion-related power system 90 provided to the flying object 100. The power conversion device 1 according to embodiment 1 or 2 makes it possible to reduce the size and the weight of the cooler as described above. Therefore, by providing the power conversion device 1 to the propulsion-related power system 90 of the flying object 100, it is possible to reduce the size and the weight of the multilevel inverter 2 for an electric flying object. Thus, fuel efficiency of the flying object 100 is improved.

Embodiment 4

The present embodiment relates to a flying object 100 provided with the power conversion device 1 according to embodiment 1 or 2. The flying object 100 is, for example, an airplane, a helicopter, a drone, or a flying vehicle.

Figure 29:
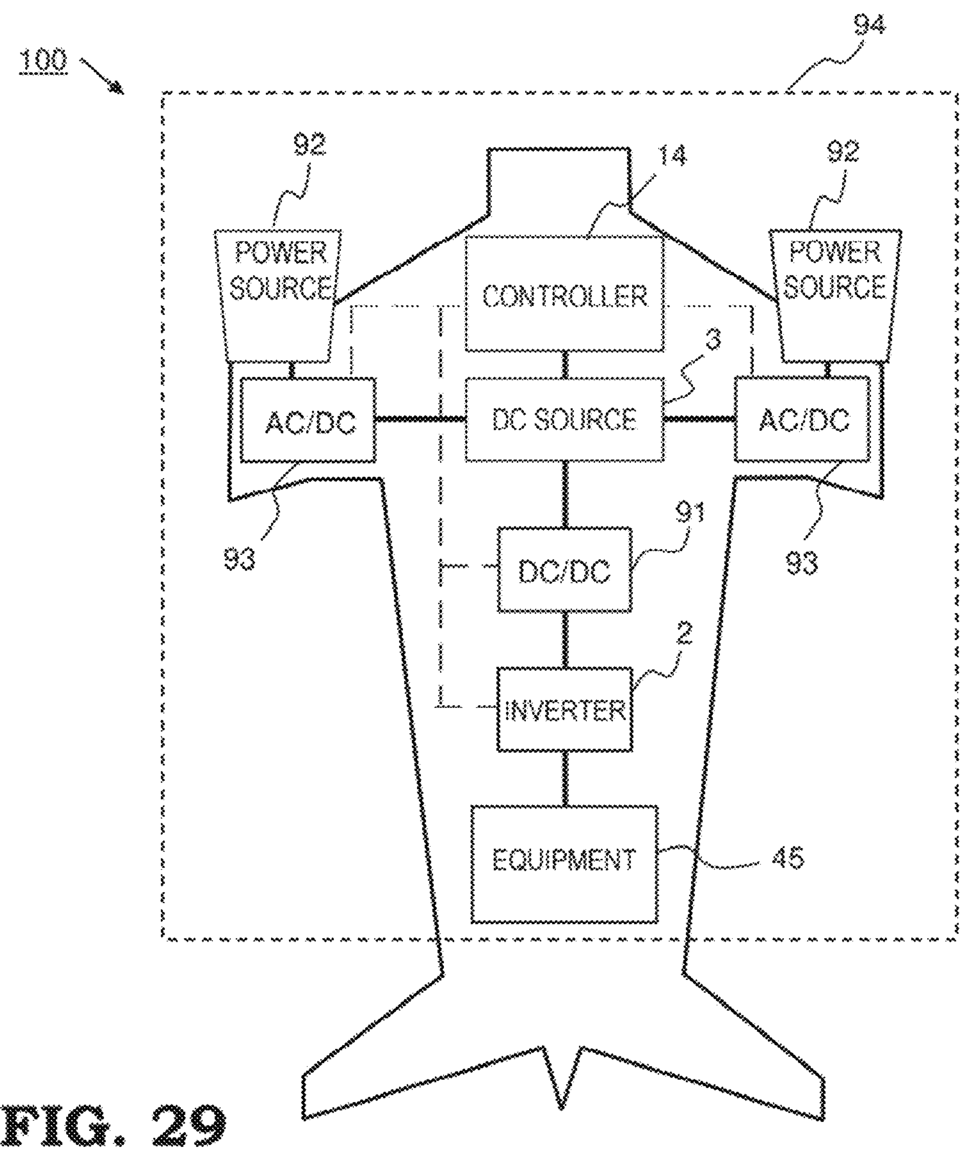
FIG. 29 is a block diagram showing the configuration of a flying object according to embodiment 4.

FIG. 29 is a schematic block diagram of the flying object 100 according to embodiment 4. The flying object 100 includes the power conversion device including the multilevel inverter 2 described in embodiment 1 or 2. The flying object 100 includes, as an equipment-related power system 94, a power source 92, an AC/DC converter 93 which is connected to the power source 92 and converts AC power to DC power, the DC source 3 connected to the AC/DC converter 93, a step-up, step-down, or step-up and step-down DC/DC converter 91 which is connected to the DC source 3 and performs conversion to predetermined voltage, the multilevel inverter 2 which converts DC power stepped down by the DC/DC converter 91, to AC power, and equipment 45 which is a load of the multilevel inverter 2 and is supplied with power. The controller 14 controls the DC/DC converter 91, the multilevel inverter 2, and the AC/DC converter 93. The controller 14 and the multilevel inverter 2 form the power conversion device 1 according to embodiment 1 or 2. The controller 14 may be provided inside the multilevel inverter 2, or may be provided to a device different from the multilevel inverter 2. The equipment 45 is equipment that uses power from the DC source 3 and includes, for example, an electric motor or the like used for driving an air conditioning device, an engine starter, or an auxiliary power device.

In the flying object 100 of the present embodiment 4, the power conversion device 1 according to embodiment 1 or 2 is used as a power supply source for the equipment 45 provided to the flying object 100. Thus, as in embodiment 3, since it is possible to reduce the size and the weight of the cooler, it is possible to reduce the size and the weight of the multilevel inverter 2 for a flying object. Thus, fuel efficiency of the flying object 100 is improved.

Although various exemplary embodiments and examples are described in the present application, various features, aspects, and functions described in one or more embodiments are not inherent in a particular embodiment, and can be applicable alone or in their various combinations to each embodiment. Accordingly, countless variations that are not illustrated are envisaged within the scope of the art disclosed herein. For example, the case where at least one component is modified, added or omitted, and the case where at least one component is extracted and combined with a component in another embodiment are included.

DESCRIPTION OF THE REFERENCE CHARACTERS

1 power conversion device
2 multilevel inverter
3 DC source
4 load
14 controller
16 temperature sensor
20 main inverter
30 sub inverter
41 first switch group
42 second switch group
44, 45 equipment
50 heat sink (cooler)
60 board (attachment member)
70 housing (attachment member)
100 flying object
C neutral point
N minus terminal
P plus terminal
Sw5 first switch
Sw2 second switch
Sw6 third switch
Sw3 fourth switch
Sw1 fifth switch
Sw4 sixth switch

The invention claimed is:

1. A power conversion device comprising:

a main inverter including a plurality of switches each composed of a switching element and a diode connected in parallel to the switching element, the main inverter being provided with capacitors having a neutral point between a plus terminal to which a plus potential of DC is applied and a minus terminal to which a minus potential of DC is applied, the main inverter being capable of outputting at least the potential of the plus terminal, the potential of the minus terminal, and a potential of the neutral point;

a sub inverter connected to output of the main inverter; and a controller which controls the main inverter and the sub inverter, wherein the main inverter and the sub inverter form a multilevel inverter that outputs multilevel voltages by adding or subtracting voltage of the sub inverter to or from output voltage of the main inverter, the main inverter includes such a configuration that a first switch group in which at least a first switch and a second switch are connected in series and a second switch group in which at least a third switch and a fourth switch are connected in series, are connected in parallel between the neutral point and the sub inverter, and the controller is capable of switching operation of the main inverter between PWM operation in which a plurality of pulses are outputted in each of output of the potential of the plus terminal and output of the potential of the minus terminal in one cycle and a pulse width is controlled with PWM control through one cycle, and one-pulse operation in which one pulse is outputted in each of output of the potential of the plus terminal and output of the potential of the minus terminal in one cycle, and the controller has a current-split switching mode for controlling a plurality of the switching elements included in the main inverter so that current flowing between the neutral point and the sub inverter flows through the first switch group and the second switch group at the same time, in a case where the main inverter outputs zero voltage which is the potential of the neutral point, in the one-pulse operation.

2. The power conversion device according to claim 1, wherein a fifth switch is connected between the plus terminal and a connection point at which the first switch and the second switch are connected, and a sixth switch is connected between the minus terminal and a connection point at which the third switch and the fourth switch are connected.

3. The power conversion device according to claim 2, wherein the first switch and the third switch are connected to the neutral point, the second switch and the fourth switch are connected to a cooler, and at least one of the first switch and the third switch is attached to a member having lower cooling performance than the cooler.

4. The power conversion device according to claim 1, wherein the controller has a loss-distributed switching mode for controlling a plurality of the switching elements included in the main inverter so that current flowing between the neutral point and the sub inverter flows through one of the first switch group and the second switch group, in a case where the main inverter outputs the zero voltage in the PWM operation.

5. The power conversion device according to claim 4, wherein the controller switches between the current-split switching mode and the loss-distributed switching mode at a timing of switching the operation of the main inverter between the one-pulse operation and the PWM operation.

6. The power conversion device according to claim 5, wherein temperature sensors are provided to the switches of the main inverter, and the controller controls switching operations of the switches in the loss-distributed switching mode, on the basis of temperature values detected by the temperature sensors.

7. The power conversion device according to claim 4, wherein temperature sensors are provided to the switches of the main inverter, and the controller controls switching operations of the switches in the loss-distributed switching mode, on the basis of temperature values detected by the temperature sensors.

8. The power conversion device according to claim 1, wherein the controller has a loss-distributed switching mode for controlling a plurality of the switching elements included in the main inverter so that current flowing between the neutral point and the sub inverter flows through one of the first switch group and the second switch group, in a case where the main inverter outputs the zero voltage in the one-pulse operation, and in the one-pulse operation, the controller cyclically switches between the current-split switching mode and the loss-distributed switching mode.

9. The power conversion device according to claim 8, wherein temperature sensors are provided to the switches of the main inverter, and the controller controls switching operations of the switches in the loss-distributed switching mode, on the basis of temperature values detected by the temperature sensors.

10. The power conversion device according to claim 1, wherein the first switch and the third switch are connected to the neutral point, the second switch and the fourth switch are connected to a cooler, and at least one of the first switch and the third switch is attached to a member having lower cooling performance than the cooler.

11. A flying object comprising:

a DC source;

equipment that uses power from the DC source; and the power conversion device according to claim 1, which is a power conversion device for converting the power from the DC source and supplying the converted power to the equipment.

12. The power conversion device according to claim 1, wherein the controller switches between the PWM operation and the one-pulse operation based on a condition of a load connected to the sub inverter.

13. The power conversion device according to claim 12, wherein the condition of the load includes at least one of a power condition of the load and a frequency condition of the load.

14. A power conversion device comprising:

a main inverter including a plurality of switches each composed of a switching element and a diode connected in parallel to the switching element, the main inverter being provided with capacitors having a neutral point between a plus terminal to which a plus potential of DC is applied and a minus terminal to which a minus potential of DC is applied, the main inverter being capable of outputting at least the potential of the plus terminal, the potential of the minus terminal, and a potential of the neutral point;

a sub inverter connected to output of the main inverter; and a controller which controls the main inverter and the sub inverter, wherein the main inverter and the sub inverter form a multilevel inverter that outputs multilevel voltages by adding or subtracting voltage of the sub inverter to or from output voltage of the main inverter, the main inverter includes such a configuration that a first switch group in which at least a first switch and a second switch are connected in series and a second switch group in which at least a third switch and a fourth switch are connected in series, are connected in parallel between the neutral point and the sub inverter, and the controller is capable of switching operation of the main inverter between PWM operation in which a plurality of pulses are outputted in each of output of the potential of the plus terminal and output of the potential of the minus terminal in one cycle and a pulse width is controlled, and one-pulse operation in which one pulse is outputted in each of output of the potential of the plus terminal and output of the potential of the minus terminal in one cycle, and the controller has a current-split switching mode for controlling a plurality of the switching elements included in the main inverter so that current flowing between the neutral point and the sub inverter flows through the first switch group and the second switch group at the same time, in a case where the main inverter outputs zero voltage which is the potential of the neutral point, in the one-pulse operation and a loss-distributed switching mode for controlling a plurality of the switching elements included in the main inverter so that current flowing between the neutral point and the sub inverter flows through one of the first switch group and the second switch group, in a case where the main inverter outputs the zero voltage in the PWM operation.

15. The power conversion device according to claim 14, wherein the controller switches between the current-split switching mode and the loss-distributed switching mode at a timing of switching the operation of the main inverter between the one-pulse operation and the PWM operation.

16. The power conversion device according to claim 14, wherein temperature sensors are provided to the switches of the main inverter, and the controller controls switching operations of the switches in the loss-distributed switching mode, on the basis of temperature values detected by the temperature sensors.

17. A flying object comprising:

a DC source;

equipment that uses power from the DC source; and the power conversion device according to claim 14, which is a power conversion device for converting the power from the DC source and supplying the converted power to the equipment.

18. A power conversion device comprising:

a main inverter including a plurality of switches each composed of a switching element and a diode connected in parallel to the switching element, the main inverter being provided with capacitors having a neutral point between a plus terminal to which a plus potential of DC is applied and a minus terminal to which a minus potential of DC is applied, the main inverter being capable of outputting at least the potential of the plus terminal, the potential of the minus terminal, and a potential of the neutral point;

a sub inverter connected to output of the main inverter; and a controller which controls the main inverter and the sub inverter, wherein the main inverter and the sub inverter form a multilevel inverter that outputs multilevel voltages by adding or subtracting voltage of the sub inverter to or from output voltage of the main inverter, the main inverter includes such a configuration that a first switch group in which at least a first switch and a second switch are connected in series and a second switch group in which at least a third switch and a fourth switch are connected in series, are connected in parallel between the neutral point and the sub inverter, and the controller is capable of switching operation of the main inverter between PWM operation in which a plurality of pulses are outputted in each of output of the potential of the plus terminal and output of the potential of the minus terminal in one cycle and a pulse width is controlled, and one-pulse operation in which one pulse is outputted in each of output of the potential of the plus terminal and output of the potential of the minus terminal in one cycle, and the controller has a current-split switching mode for controlling a plurality of the switching elements included in the main inverter so that current flowing between the neutral point and the sub inverter flows through the first switch group and the second switch group at the same time, in a case where the main inverter outputs zero voltage which is the potential of the neutral point, in the one-pulse operation and a loss-distributed switching mode for controlling a plurality of the switching elements included in the main inverter so that current flowing between the neutral point and the sub inverter flows through one of the first switch group and the second switch group, in a case where the main inverter outputs the zero voltage in the PWM operation, and in the one-pulse operation, the controller cyclically switches between the current-split switching mode and the loss-distributed switching mode.

19. The power conversion device according to claim 18, wherein temperature sensors are provided to the switches of the main inverter, and the controller controls switching operations of the switches in the loss-distributed switching mode, on the basis of temperature values detected by the temperature sensors.

20. A flying object comprising:

a DC source;

equipment that uses power from the DC source; and the power conversion device according to claim 18, which is a power conversion device for converting the power from the DC source and supplying the converted power to the equipment.

* * * * *